United States Patent
Horigome

(10) Patent No.: US 8,582,402 B2
(45) Date of Patent: Nov. 12, 2013

(54) OPTICAL RECORDING MEDIUM AND RECORDING DEVICE

(75) Inventor: Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 27 days.

(21) Appl. No.: 13/278,510

(22) Filed: Oct. 21, 2011

(65) Prior Publication Data

US 2012/0106308 A1 May 3, 2012

(30) Foreign Application Priority Data

Oct. 28, 2010 (JP) ................................. 2010-242069

(51) Int. Cl.
- *G11B 7/00* (2006.01)
- *G11B 5/55* (2006.01)
- *G11B 5/09* (2006.01)
- *G11B 5/58* (2006.01)

(52) U.S. Cl.
USPC .................. 369/44.26; 369/44.11; 369/44.14; 369/44.25; 369/53.28; 369/47.37; 369/53.23

(58) Field of Classification Search
USPC .......... 369/44.26, 44.11, 44.14, 44.25, 53.28, 369/47.37, 53.23, 51
See application file for complete search history.

(56) References Cited

U.S. PATENT DOCUMENTS

| 2008/0186840 A1 | 8/2008 | Uchiyama et al. |
| 2008/0205257 A1 | 8/2008 | Yamatsu et al. |
| 2009/0303849 A1* | 12/2009 | Nakatani et al. ........... 369/47.53 |
| 2012/0092976 A1* | 4/2012 | Urakawa ................... 369/44.14 |

FOREIGN PATENT DOCUMENTS

| JP | 2008-135144 A | 6/2008 |
| JP | 2008-176902 A | 7/2008 |

* cited by examiner

*Primary Examiner* — Aneeta Yodichkas
(74) *Attorney, Agent, or Firm* — Wolf, Greenfield & Sacks, P.C.

(57) ABSTRACT

An optical recording medium in which recording is performed by a recording device that is configured such that tracking servo control of recording light is performed by irradiating the recording light and ATS light for an adjacent track servo and by an adjacent track servo based on reflected light of the ATS light, wherein while a recording layer in which a mark is formed according to an irradiation of the recording light is included, a mark row is formed in advance by a pitch that is twice a distance between an irradiation spot of the recording light and an irradiation spot of the ATS light or greater in the recording layer.

11 Claims, 13 Drawing Sheets

PRIOR ART

OPTICAL RECORDING MEDIUM AND RECORDING DEVICE

BACKGROUND

The present disclosure relates to an optical recording medium and a recording device thereof, and particularly one that is suitable for being applied in a case when tracking servo with respect to recording light is performed by an adjacent track servo.

As optical recording media in which recording and reproduction of a signal is performed by irradiation of light, so-called optical discs, for example, CDs (Compact Discs), DVDs (Digital Versatile Discs), BDs (Blu-ray Discs: registered trademark), and the like have been popularized.

In relation to an optical recording medium that is expected to become the next generation of optical recording media that are currently popularized such as CDs, DVDs, and BDs, the present applicant has already proposed a so-called bulk recording type optical recording medium that is described in Japanese Unexamined Patent Application Publication No. 2008-135144 and Japanese Unexamined Patent Application Publication No. 2008-176902.

Here, bulk recording is a technique of increasing recording capacity by performing multi-layer recording within a bulk layer 102 by performing laser light irradiation while successively changing the focal position with respect to an optical recording medium (bulk type recording medium 100) that includes at least a cover layer 101 and the bulk layer (recording layer) 102 as illustrated in FIG. 9, for example.

In relation to such bulk recording, a recording technique known as a micro-holographic method is disclosed in Japanese Unexamined Patent Application Publication No. 2008-135144.

With the micro-holographic method, a so-called holographic recording material is used as the recording material of the bulk layer 102. As a holographic recording material, for example, a photopolymerization type photopolymer or the like is widely used.

The micro-holographic method is broadly divided into a positive type micro-holographic method and a negative type micro-holographic method.

The positive type micro-holographic method is a technique of forming minute interference patterns (holograms) by concentrating light of two opposing luminous fluxes (luminous flux A, luminous flux B) in the same position, which become the recording marks.

Further, the negative type micro-holographic method is the opposite idea to the positive micro-holographic method, and is a technique in which interference patterns that are formed in advance are erased and the erased portions become the recording marks. With the negative type micro-holographic method, an initialization process for forming interference patterns with respect to the bulk layer 102 in advance before performing the recording action is performed. Specifically, as the initialization process, luminous fluxes by parallel light are irradiated to be opposing, and the interference patterns are formed over the entirety of the bulk layer 102.

Further, having formed the interference patterns in advance by the initialization process in such a way, information recording by the formation of erasure marks is performed. That is, information recording by erasure marks is performed by performing laser light irradiation according to the recording information in a state in which the focus is on an arbitrary layer position.

Furthermore, the applicant also proposes a recording technique of forming, for example, voids (vacancies) as disclosed in Japanese Unexamined Patent Application Publication No. 2008-176902 as recording marks as a technique of bulk recording which is different from the micro-holographic method.

The void recording method is a technique of recording vacancies (voids) within the bulk layer 102 by performing laser light irradiation at relatively high power on a bulk layer 102 that is configured, for example, by a recording material such as a photopolymerization type photopolymer. As described in Japanese Unexamined Patent Application Publication No. 2008-176902, the vacancy portions that are so formed become portions with a different refraction index from other portions within the bulk layer 102, and the reflection rate of light in bordering portions therebetween is increased. The vacancy portions therefore function as recording marks, and information recording by the formation of the vacancy marks is thereby realized.

Since such a void recording method does not form holograms, light irradiation from only one side is sufficient. That is, recording marks are not formed by concentrating light of two luminous fluxes on the same position as in the case of the positive type micro-holographic method.

Further, in a comparison with the negative micro-holographic method, there is an advantage that an initialization process is not performed.

Here, although an example in which irradiation of pre-curing light before recording is performed in performing void recording is shown in Japanese Unexamined Patent Application Publication No. 2008-176902, recording of voids is possible even if the irradiation of such pre-curing light is omitted.

Here, although the optical recording medium is a bulk recording type (also referred to simply as bulk type) optical recording medium in which various types of recording techniques above are proposed, the recording layer (bulk layer) of an optical recording medium of such a bulk type does not explicitly include a multilayer structure whereby a plurality of reflecting films, for example, are formed. That is, position guides for each recording layer as included in an ordinary multilayer disc or reflective films on which such guides are formed are not provided in the bulk layer 102.

Therefore, with the structure of the bulk type recording medium 100 as illustrated in FIG. 9 earlier, it is not possible to perform focus servo or tracking servo when recording when marks are not formed.

For such a reason, with respect to the bulk type recording medium 100, reflecting surfaces (reference surfaces) with position guides as illustrated in FIG. 10 are provided as references.

Specifically, position guides (guide channels) formed as pits and grooves, for example, are formed on the lower surface side of a cover layer 101 in a spiral form or a concentric form, and a selective reflection film 103 is formed thereon. The bulk layer 102 is then formed on the lower layer side of the cover layer 101 on which the selection reflection film 103 is formed in such a manner via an adhesive material such as, for example, a UV curing resin as an intermediate layer 104 in the drawing.

Here, recording of the absolute position information (address information) such as, for example, the radial position information or the rotation angle information is performed by the formation of the guide channels described above such as pits and grooves. In the description below, a surface on which such guide channels are formed and recording of absolute position information is performed (here, the formation surface of the selective reflection film 103) is referred to as a "reference surface Ref".

In addition, on top of the medium structure as described above, servo laser light (also referred to simply as servo light) as laser light for position control is irradiated on the bulk type recording medium 100 separately from the laser light for the recording of marks (hereinafter, also referred to as recording laser light or simply recording light) as illustrated in FIG. 11 below.

As illustrated in the drawings, such recording laser light and servo laser light are irradiated on the bulk type recording medium 100 via a common objective lens.

At this time, there is a concern that if the servo laser light reaches the bulk layer 102, there may be a detrimental effect on the mark recording within the bulk layer 102. In the bulk recording method of the related art, therefore, laser light with a different wavelength band from the recording laser light is used as the servo laser light, and the selective reflection film 103 with a wavelength selectivity that reflects servo laser light and transmits recording laser light is provided as the reflection film that is formed on the reference surface Ref.

The action of recording marks on the bulk type recording medium 100 will be described with reference to FIG. 11 upon the premise described above.

First, when performing multilayer recording on the bulk layer 102 on which guide channels or reflection films are not formed, where the positions of the layer positions on which marks are recorded in the depth direction within the bulk layer 102 are is determined in advance. In the drawing, a case is exemplified in which a total of five information recording layer positions L from a first information recording layer position L1 to a fifth information recording layer position L5 are set as layer positions on which marks are formed within the bulk layer 102 (mark formation layer position: also referred to as information recording layer position). As illustrated in the drawings, the first information recording layer position L1 is set at a position that is separated from the selective reflection film 103 (reference surface Ref) on which guide channels are formed by a first offset of-L1 in the focus direction (depth direction). Further, the second information recording position L2, the third information recording layer position L3, the fourth information recording layer position L4, and the fifth information recording layer position L5 are respectively set in positions that are separated by a second offset of-L2, a third offset of-L3, a fourth offset of-L4, and a fifth offset of-L5.

When recording while marks are not yet formed, it is not possible to perform focus servo or tracking servo with each of the layer positions within the bulk layer 102 as the targets based on the reflected light of the recording laser light. Therefore, focus servo control and tracking servo control of the objective lens when recording is performed by spot positions of the servo laser light following the guide channels on the reference surface Ref based on the reflected light of the servo laser light.

However, it is important that the recording laser light reaches the bulk layer 102 that is formed on a lower layer side than the reference surface Ref for mark recording. Therefore, in such an optical system, a recording light focusing mechanism for independently adjusting the focus positions of the recording laser light are provided separately from the focusing mechanism of the objective lens.

Specifically, an expander that changes the collimation state of the recording laser light (dispersed, parallel, converged) that is incident on the objective lens is provided as such a recording light focusing mechanism. That is, by changing the collimation state of the recording laser light that is incident on the objective in such a manner, the focus positions of the recording laser light are able to be adjusted independently from the servo laser light.

By providing such a focusing mechanism for the recording laser light, by the focus and tracking servo control of the objective lens being performed based on the reflected light of the servo laser light from the reference surface Ref as described above, the focus positions of the recording laser light match the desired information recording layer positions L within the bulk layer 102 while being controlled to positions that correspond to the guide channels that are formed on the reference surface Ref in the tracking direction.

Here, when performing reproduction of the bulk type recording medium 100 on which mark recording is already performed, the position of the objective lens may not be controlled based on the reflected light of the servo laser light as when recording. That is, when reproducing, focus and tracking servo control of the objective lens may be performed based on the reflected light of the laser light that is irradiated with mark rows that are formed on information recording layer positions L (also referred to as information recording layers L when reproducing) that are the reproduction targets as targets.

As described above, with the bulk recording method, while irradiating recording laser light for performing mark recording and servo light as position control light on the bulk type recording medium 100 via a common objective lens (by synthesizing over the same optical axis), when recording, by performing focus servo control and tracking servo control of the objective lens such that the servo laser light follows the position guides on the reference surface Ref and separately adjusting the focus positions of the recording laser light by the recording light focusing mechanism described above, even if position guides are not formed within the bulk layer 102, mark recording is possible in the desired positions (depth direction and tracking direction) within the bulk layer 102.

Furthermore, when reproducing, it is possible to perform focus servo control and tracking servo control of the objective lens based on the reflected light of the light that is irradiated with the mark rows that are already recorded as targets. That is, servo control by the servo laser light when reproducing is unnecessary.

Here, in a case when the bulk recording method that has hitherto been described is adopted, spot position deviation in the recording surface direction of the recording laser light and the servo laser light occurs accompanying the generation of skew (tilt) or the generation of lens shift of the objective lens that accompanies disc eccentricity.

That is, a change in the relative positional relationship of the spot position of the recording laser light and the spot position of the servo laser light in the recording surface direction (tracking direction) occurs accompanying the generation of skew or lens shift, and as a result, it becomes not possible to perform mark recording on intended positions within the bulk layer 102.

Such spot position deviation is caused by positions of the spot positions of the recording laser light and the spot positions of the servo laser light in the recording surface direction being designed to match in an ideal state in which there is no skew or lens shift in the optical system of the bulk recording system described above.

If deviation in the information recording positions occurs accompanying such skew and lens shift, there is a concern that information recording positions overlap between adjacent tracks particularly in a case when additional recording that is accompanied by disc replacement is performed.

Specifically, since eccentricity or skewing of a disc may occur in different forms when the disc is loaded according to the clamping of the disc on the spindle motor or the like, when performing additional recording that is accompanied by disc replacement such as, for example, performing additional recording by loading a disc on a different drive after performing recording on a given disc with a given drive, there is a concern that overlapping or in some cases crossing of the mark rows of the recording portions and the mark rows of the additional recording portions occurs due to the form of the skewing and the eccentricity when recording previously and the form of the skewing and the eccentricity when recording additionally being different.

If overlapping or crossing of mark rows occurs in such a way, it becomes no longer possible to correctly reproduce recording signals.

Therefore, as one technique for preventing the occurrence of such overlapping or crossing, setting the track pitch of the reference surface Ref to be relatively large is exemplified.

However, in a case when the track pitch of the reference surface Ref is enlarged, naturally, shrinking of the recording capacity of the bulk layer 102 is caused.

Further, as another technique, for example, a system in which there is no replacement of a disc such as a hard disk is considered.

However, since exchanging of discs is naturally not performed at all with such a technique, when there is a problem with the disc, for example, it is not possible to exchange only the disc. Further, it is not possible to read data that is recorded by a given recording device with another recording device. The result, therefore, is that convenience is lost in such respects.

As an effective technique for avoiding such problems, therefore, adopting a so-called ATS (Adjacent Track Servo) technique is considered. The ATS was originally considered as a self servo track writer (SSTW) for a hard disk drive.

FIG. 12 is a diagram for describing the ATS.

As shown in the drawing, in the ATS, a recording spot S_rec and an adjacent track servo spot S_ats are formed on a recording medium (within the bulk layer 102). The recording spot S_rec and the adjacent track servo spot S_ats are formed by irradiating light beams that are respectively the origins thereof via a common objective lens. At this time, the distance between each of the spots S is fixed.

With the ATS, the recording spot S_rec is the leading spot (that is, the outer circumference side in a case when the progress direction of the recording is from the inner circumference to the outer circumference), the adjacent track servo spot S_ats is the following spot, and tracking servo is performed by the adjacent track servo spot S_ats with the mark rows that are formed by the recording spot S_rec as the targets. That is, tracking servo control of the objective lens is performed such that the adjacent track servo spot S_ats follows one track before the recording spot S_rec is formed.

According to such an ATS, since the track pitch is fixed as the distance between each of the spots S, the problem whereby the tracks overlap (information recording positions overlapping) due to the influence of eccentricity or the like does not occur. That is, there is no reason to unnecessarily enlarge the track pitch in consideration of the deviation of recording positions due to eccentricity or the like as described above, or to provide a system in which a disc is not removable.

SUMMARY

Incidentally, with a recording device of an optical recording medium, there are those performing so-called OPC (Optimum Power Control) for improving recording quality.

Performing OPC is naturally also considered for a recording device of the bulk type recording medium 100.

FIG. 13 is a diagram for describing a reasonable technique (technique of the related art) that is considered in a case when OPC is performed in a recording device of the bulk type recording medium 100 that performs tracking servo control by the ATS.

First, in a case when OPC is performed in a recording device of such a case, guiding prerecorded mark rows Mp as shown in the drawing are formed (recorded) in advance (broken line in the drawing) for each of the information recording positions L within the bulk layer 102.

At this time, in the ATS, as described in FIG. 12 earlier, since the adjacent track servo spot S_ats is performed so as to follow the mark rows of the previous rotation recorded by the recording spot S_rec, setting the guiding prerecorded mark rows Mp in such a case to have the same formation pitch (formation pitch in the radial direction: also referred to below as track pitch) as the separation distances (hereinafter, referred to as inter-spot distances) in the radial direction between each of the spots is reasonably considered.

Having formed such guiding prerecorded mark rows Mp in advance, during OPC, trial writing by the recording spot S_rec begins according to the adjacent track servo spot S_ats reaching a position that is substantially one rotation before the head of the trial writing starting address in a state in which the adjacent track servo spot S_ats is caused to follow the guiding prerecorded mark row Mp by the ATS.

In the drawing, the state at a time point in which trial writing for one disc rotation has been completed is illustrated.

Once trial writing is completed, calculation of the evaluation value is performed by performing reading of the trial written signal. When evaluating, a servo by the ATS may be performed in the same manner as when trial writing, or tracking servo using the recording spot S_rec (reproduction power) may be performed.

By forming the guiding prerecorded mark row Mp as described above, it is possible to perform trial writing for the OPC of predetermined positions (trial written regions) on the disc.

However, it is to be noted that the trial writing for the OPC is performed by successively changing the laser power. That is to say, in a region in which trial writing is performed, as illustrated in the drawings, there are portions in which recording is performed with excessive laser power (dark portions in the drawing) and portions in which recording is performed with insufficient laser power (light portions in the drawing).

For such a reason, in the case of the OPC technique of the related art as described above, there is a concern that stably performing tracking servo control in regions after trial writing is started becomes not possible.

In such a manner, there is a concern that suitably performing trial writing after the second rotation since starting the trial writing becomes not possible.

Further, it becomes difficult to suitably perform evaluation of the trial written signal, and the OPC itself is not suitably performed.

It is desirable to allow OPC to be suitably performed in a recording device in which tracking servo with respect to recording light is performed by ATS.

An optical recording medium according to an embodiment of the disclosure is configured as below.

That is, an optical recording medium in which recording is performed by a recording device that is configured such that tracking servo control of recording light is performed by irradiating the recording light and ATS light for adjacent track servo and by adjacent track servo based on reflected light of the ATS light, wherein a recording layer in which marks are formed according to the irradiation of the recording light is included.

Further, mark rows are formed in advance by a pitch that is twice the distance between the irradiation spot of the recording light and the irradiation spot of the ATS light or greater in the recording layer.

Further a recording device according to another embodiment of the disclosure is configured as below.

That is, a recording device according to an embodiment of the disclosure is a recording device configured such that tracking servo control of recording light is performed by irradiating the recording light and ATS light for an adjacent track servo by an adjacent track servo based on reflected light of the ATS light with respect to an optical recording medium, the recording device including a light irradiation and light receiving unit that irradiates the recording light and the ATS light on the optical recording medium in which mark rows are formed in advance by a pitch that is twice the distance between an irradiation spot of the recording light and an irradiation spot of the ATS light or greater in a recording layer thereof.

Further, the recording device includes a tracking mechanism unit that retains the objective lens to be displaceable in a tracking direction.

Further, the recording device includes a tracking error signal generation unit that generates a tracking error signal that represents an error of an irradiation spot position of the ATS light in a tracking direction with respect to mark rows that are formed in the recording layer, based on a light receiving signal of the ATS light which is obtained by the light irradiation and receiving unit.

Further, the recording device includes an adjacent track servo control unit that controls the tracking mechanism unit so as to follow mark rows in which an irradiation spot of the ATS light is formed on the recording layer based on the tracking error signal.

Further, the recording device includes a control unit that performs control such that trial writing in which power of successive recording light is changed in a state in which an irradiation spot of the ATS light follows the mark rows that are formed in advance by a tracking servo control by the adjacent track servo control unit.

As described above, according to embodiments of the disclosure, as prerecorded mark rows that are to be formed in the recording layer in advance for performing trial writing of the OPC, rather than forming mark rows with the same pitch as the distance between the irradiation spot of the recording light and the irradiation spot of the ATS light as in the related art, mark rows are formed by a pitch that is twice the distance between the spots or greater.

If prerecorded mark rows are formed with such a pitch, by performing trial writing by recording light in a state in which adjacent track servo is performed by ATS light, trial writing is able to be performed between the prerecorded mark rows. Further, by performing trial writing between the prerecorded mark rows, by performing the same adjacent track servo as when trial writing (that is, tracking servo in which the recording mark rows follow the irradiation spot of the ATS light), reading (evaluation) of the trial written signal is able to be performed using the irradiation spot of the recorded light (reproduction power). That is, it is possible to avoid a situation in which tracking servo is performed with the mark rows that are trial written as the targets as in the related art.

As a result, it is possible to effectively prevent the occurrence of a situation in which it is not possible to suitably perform trial writing after the second rotation after starting the trial writing or a situation in which it is not possible to suitably perform an evaluation of the trial written signal as in the related art, and OPC is able to be suitably performed.

As described above, according to embodiments of the disclosure, it is possible to effectively avoid a situation in which tracking servo is performed with the mark rows that are trial written as the targets as in the related art.

In so doing, it is possible to prevent the occurrence of a situation in which it is not possible to suitably perform trial writing after the second rotation after starting the trial writing or a situation in which it is not possible to suitably perform an evaluation of the trial written signal as in the related art, and OPC is able to be suitably performed.

DETAILED DESCRIPTION OF EMBODIMENTS

Embodiments of the disclosure will be described below. Here, description will be made in the following order.
<1. Optical Recording Medium of Embodiment>
[1-1. Cross-Sectional Structure]
[1-2. Embodiment of Prerecorded Mark Rows]
[1-3. Formation Technique of Prerecorded Mark Rows]
<2. Specific Technique of OPC>
<3. Recording Device of Embodiment>
<4. Modified Examples>
<1. Optical Recording Medium of Embodiment>
[1-1. Cross-Sectional Structure]

Figure 1:
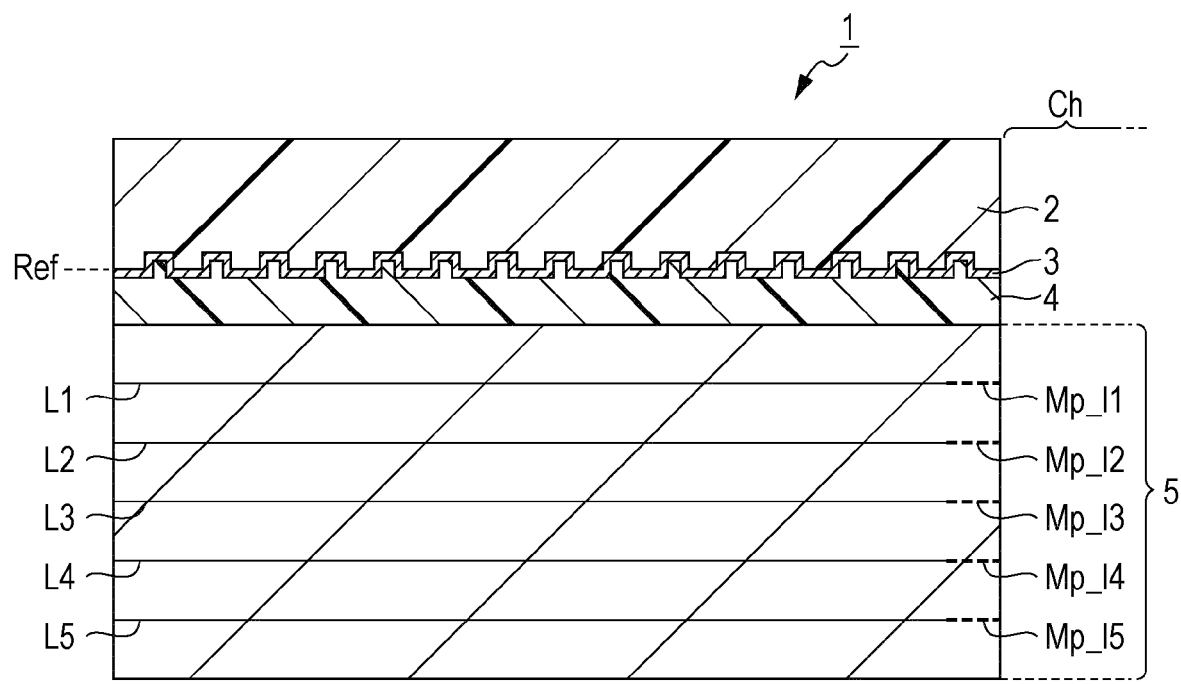
FIG. 1 is a cross-sectional structure diagram of an optical recording medium that is a recording and reproduction target in the embodiment.

FIG. 1 illustrates a cross-sectional structure diagram of an optical recording medium of the embodiment.

The optical recording medium of the embodiment is an optical recording medium of a so-called bulk recording type, and is hereinafter referred to as a bulk type recording medium 1.

The bulk type recording medium 1 is a disc-shaped optical recording medium, and mark formation (information recording) is performed by performing laser light irradiation to the bulk type recording medium 1 that is rotationally driven. Further, reproduction of the recorded information is also performed by irradiating laser light on the bulk type recording medium 1 that is rotationally driven.

Here, optical recording medium is a collective term for recording media in which recording and reproduction of information is performed by the irradiation of light.

Here, in FIG. 1, although only the cross-sectional structure of one side of a center hole Ch of the bulk type recording medium 1 is extracted and illustrated, since the cross-sectional structure of the other side is the same, the illustration thereof is omitted.

As illustrated in FIG. 1, a cover layer 2, a selective reflection film 3, an intermediate layer 4, and a bulk layer 5 are formed in order on the bulk type recording medium 1 from an upper layer side.

Here, in the specification, "the upper layer side" refers to an upper layer side when a surface on which laser light from a recording device (recording reproduction device 10) side according to the embodiment described later is incident is an upper layer.

Further, while a "depth direction" is referred to in the specification, the "depth direction" refers to a direction that matches the vertical direction that obeys the definition of "the upper layer side" described above (that is, a direction that is parallel to the incidence direction of laser light from the recording device side: focus direction).

In the bulk type recording medium 1, the cover layer 2 is configured by a resin such as polycarbonate or acryl, and as illustrated in the drawing, a lower surface thereof has a concavo convex cross-sectional shape that accompanies the formation of guide channels by pit rows or grooves (continuous channels) as position guides for guiding the recording and reproduction position.

The cover layer 2 is generated by injection molding using a stamper on which guide channels are formed as such pit rows or grooves.

Information that indicates the absolute position in a direction that is parallel to the recording surface direction of the bulk type recording medium 1 (absolute position information: radial position information and rotation angle information) is recorded by the guide channels as such pit rows or grooves. The absolute position information is recorded by modulation of the wobble frequency of the grooves in a case when the guide channels are formed by grooves, and recording is accomplished by modulation of the length or formation intervals of pits in a case when the guide channels are formed by pit rows.

The selective reflection film 3 is formed on a lower surface side of the cover layer 2 on which the guide channels are formed.

Here, as described above, with the bulk recording method, light for obtaining error signals of tracking or the focus (servo laser light) based on such guide channels are irradiated separately from light for performing recording and reproduction of marks (recording laser light) on the bulk layer 5 as the recording layer.

At this time, if the servo laser light reaches the bulk layer 5, negative influence on the mark recording within the bulk layer 5 is of concern. For such a reason, a reflection film with selectively that reflects servo laser light and transmits recording laser light is important.

With the bulk recording method of the related art, laser light with respectively different wavelength bands for the recording laser light and the servo laser light is used, and in order to correspond thereto, a selective reflection film with wavelength selectivity that reflects light with the same wavelength band as the servo laser light and transmits light with other wavelengths is used as the selective reflection film 3.

The bulk layer 5 as the recording layer is formed (adhered) on a lower layer side of the selective reflection film 3 via the intermediate layer 4 that is configured, for example, by an adhesive material such as UV curable resin.

As a formation material (recording material) of the bulk layer 5, the most appropriate material may be adopted according to the method of bulk recording that is adopted such as, for example, the positive type micro-holographic method, the negative type micro-holographic method, or the void recording method described earlier.

Here, the mark recording method with respect to the bulk type recording medium 1 is not particularly limited, and an arbitrary method within the category of bulk recording methods may be adopted. A case in which the void recording method is adopted as one example is exemplified in the description below.

Here, in the bulk type recording medium 1 with the cross-sectional structure as described above, the selective reflection film 3 on which guide channels (position guides) are formed is, as also described below, a reflection surface that is a reference in performing position control (particularly position control of the focus direction) of recording laser light based on servo laser light when recording (when recording for the first time). For such a reason, the surface on which the selective reflection film 3 is formed is hereinafter referred to as a reference surface Ref.

Figure 11:
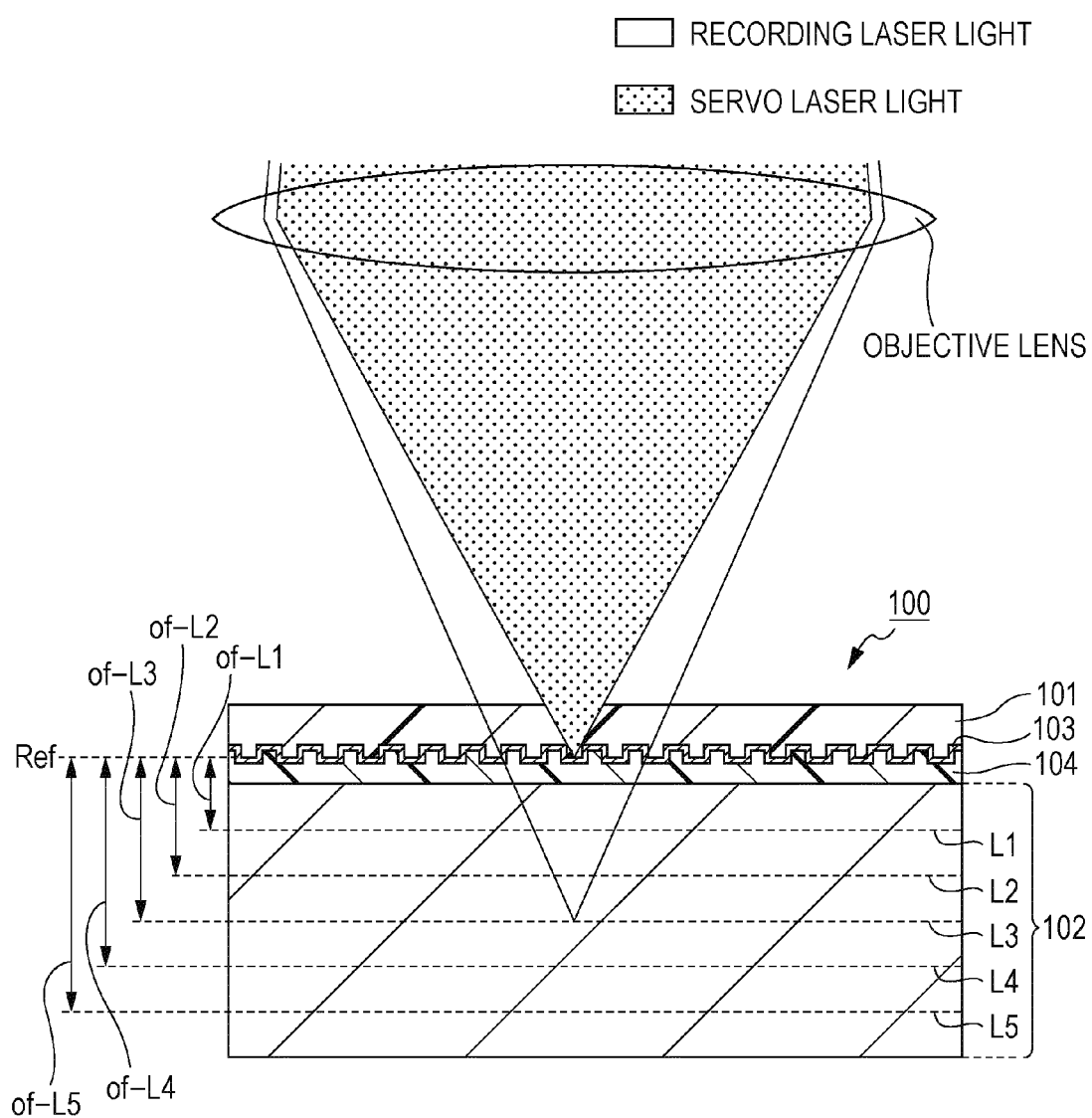
FIG. 11 is a diagram for describing an action during mark recording on a bulk type recording medium.

As also described in FIG. 11 earlier, in a bulk type optical recording medium, a layer position on which information recording is to be performed in advance (information recording layer position L) is set in order to perform multilayer recording within the bulk layer. In the bulk type recording medium 1, with regard to the information recording layer position L, similarly to the case of the earlier FIG. 11, the first information recording layer position L, the second information recording layer position L2, the third information recording layer position L3, the fourth information recording layer position L4, and the fifth information recording layer position L5 are set respectively separated from the reference surface Ref by the first offset of-L1, the second offset of-L2, the third offset of-L3, the fourth offset of-L4, and the fifth offset of-L5 in the depth direction.

Here, the number of information recording layer positions L that are set is not to be limited to 5.

Here, information of the offsets of-L from the reference surface Ref to each of the information recording layer positions L is set on a controller 39 in the recording reproduction device 10 described later.

Here, the recording directions of information in each of the information recording layer positions L in the bulk layer 5 may be the same or may be different. That is, the recording direction may be alternately changed every time a layer is crossed in what is known as a so-called opposite track pass, or the recording direction in each layer may be homogenized as in a parallel track pass.

Here, below, the parallel track pass is adopted in relation to the recording direction for convenience of description. Specifically, the recording direction in each layer position L is homogenized from the inner circumference to the outer circumference.

Here, to be sure, the "recording direction" referred to here is the direction in which recording proceeds in the disc radial direction.

Further, in the bulk type recording medium 1 of the embodiment, as illustrated in the drawings, the guiding prerecorded mark rows Mp are formed on each of the information recording layer positions L within the bulk layer 5.

As illustrated in the drawings, the guiding prerecorded mark rows Mp that are formed on the information recording layer position L1 have the reference symbol "Mp_11" and the guiding prerecorded mark rows Mp that are formed on the information recording layer position L2 have the reference symbol "Mp_12". Similarly, the information recording layer positions L3, L4, and L5 have the guiding prerecorded mark rows Mp_13, Mp_14, and Mp_15.

In the case of the present example, the guiding prerecorded mark rows Mp are formed within an OPC (Optimum Power Control) area that is set within the innermost circumference region within each of the information recording layer positions L.

Specifically, in the bulk type recording medium 1 of the present example, in each of the information recording layer positions L, although a lead in area is set in the innermost circumference region, a user data area in which recording of user data is performed is set in the outer circumference side, and a lead out area is set further to the outer circumference side thereof, the guiding prerecorded mark rows Mp in such a case are formed in the OPC area that is set within the lead in area.

Further, in the case of the present example, prerecorded mark row identification information for making the guiding prerecorded mark rows Mp identifiable is embedded in the guiding prerecorded mark rows Mp. Furthermore, in the case of the present example, address information for indicating position information (radial position information, rotation angle information) on a disc is also embedded in the guiding prerecorded mark rows Mp.

In such a manner, the guiding prerecorded mark rows Mp of the present example are formed by the recording of predetermined information including the prerecorded mark row identification information.

Here, in the case of the present example, the prerecorded mark row identification information or the address information is embedded with a predetermined interval in the guiding prerecorded mark rows Mp.

[1-2. Embodiment of Prerecorded Mark Rows]

Figure 2:
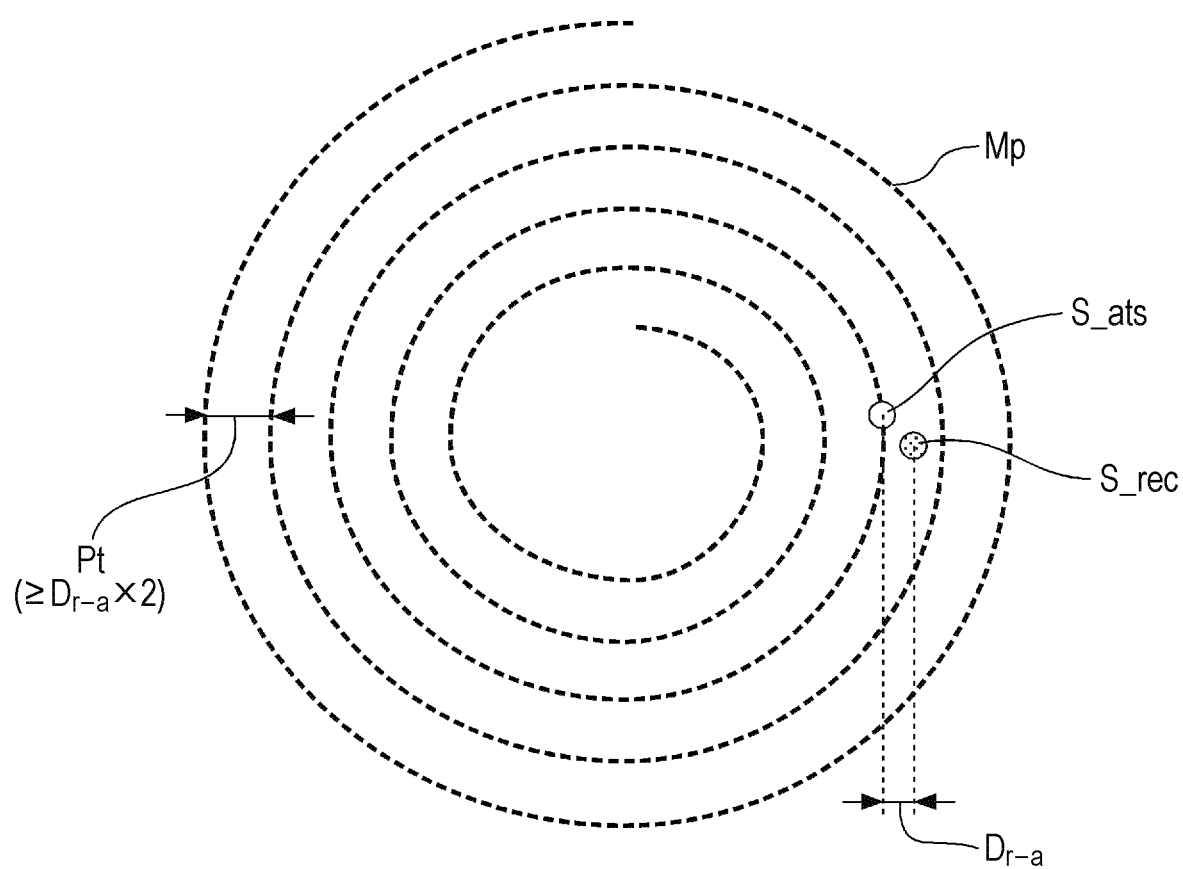
FIG. 2 is a diagram for describing a specific embodiment of a prerecorded mark row that is formed on an optical recording medium of the embodiment.

FIG. 2 is a diagram for describing a specific embodiment of the guiding prerecorded mark rows Mp of the present example.

First, in FIG. 2, an adjacent track servo spot S_ats that is an irradiation spot of ATS light that is irradiated to perform adjacent track servo (ATS) and a recording spot S_rec that is an irradiation spot of recording light (recording laser light) for performing information recording on the bulk layer 5 are illustrated.

Figure 12:
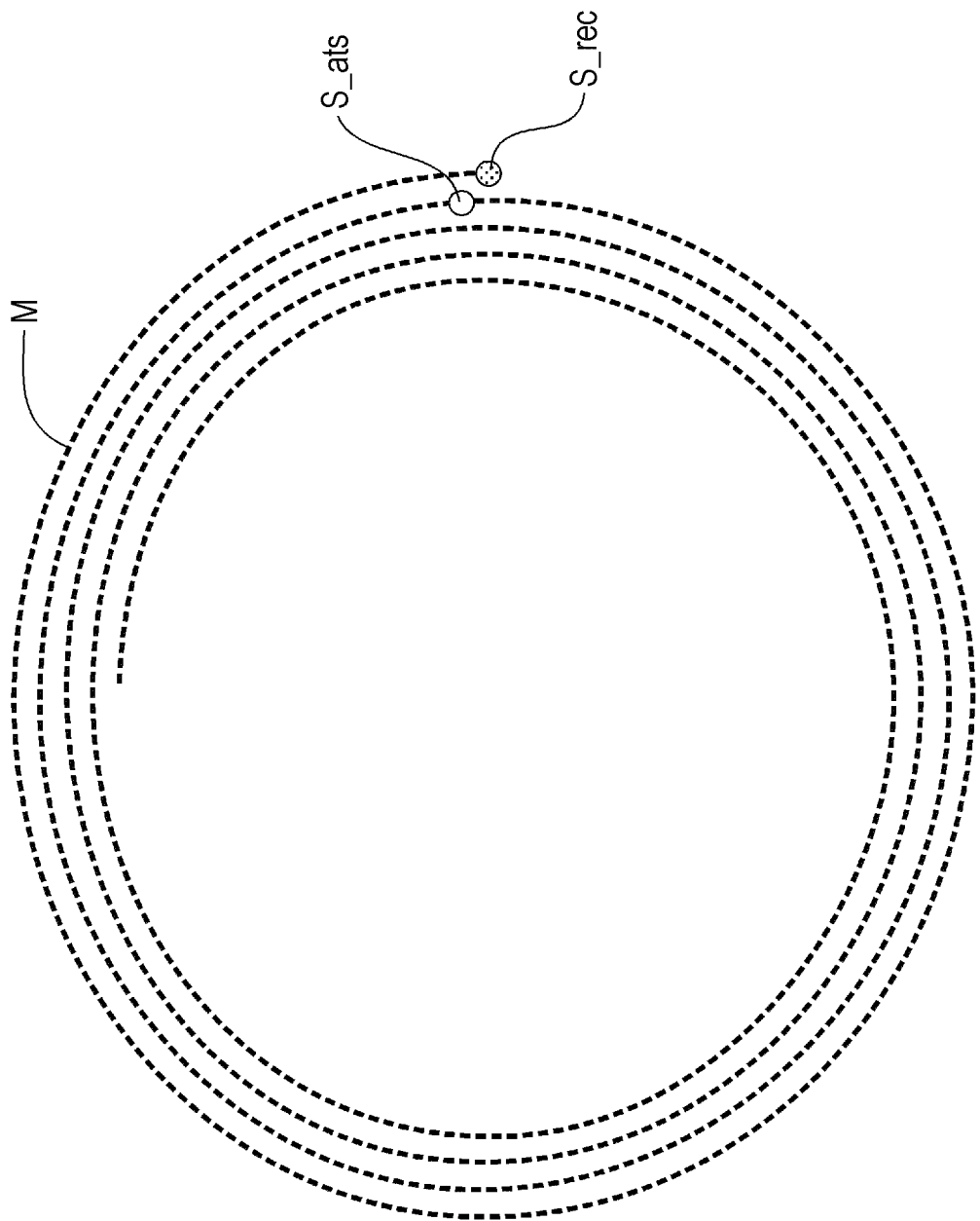
FIG. 12 is an explanatory diagram of the ATS.
Figure 13:
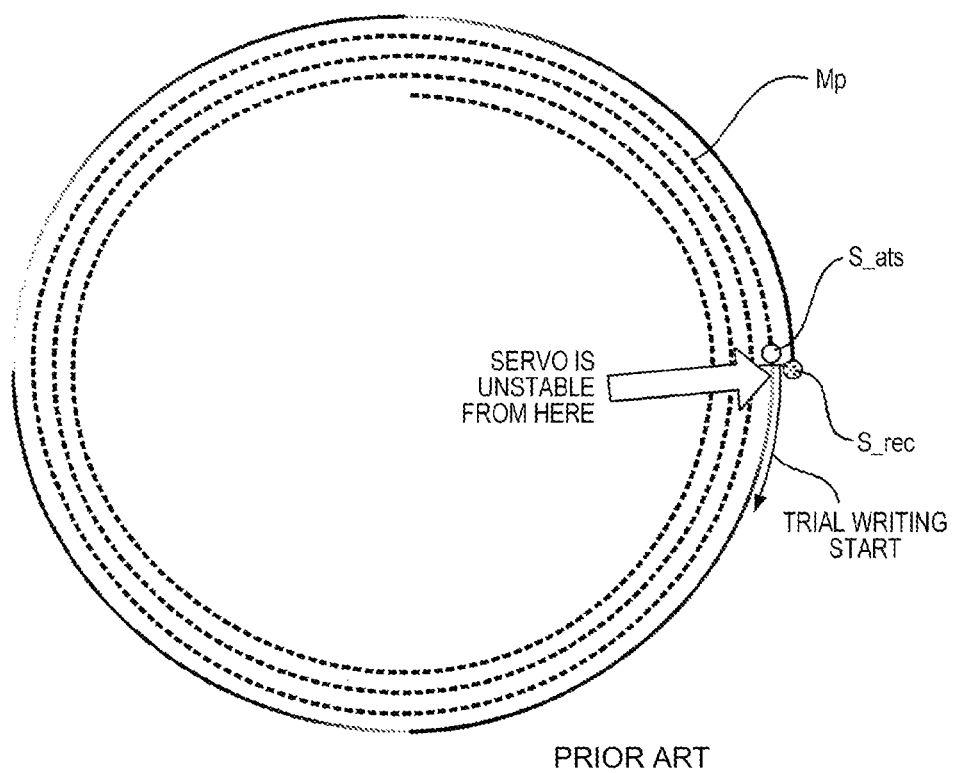
FIG. 13 is a diagram for describing a reasonable technique (technique of the related art) that is considered in a case when OPC is to be performed in a recording device that performs tracking servo control by the ATS.

As described in FIG. 12 earlier, with the ATS, tracking servo is performed such that the adjacent track servo spot S_ats traces over the mark rows with the recording spot S_rec as the leading spot and the adjacent track servo spot S_ats as the following spot. Here, since the recording direction in such a case is from the inner circumference to the outer circumference, the recording spot S_rec as the leading spot is positioned on the outer circumference side, and the adjacent track servo spot S_ats as the following spot is positioned on the inner circumference side.

Here, if the separation distance (distance between center points) in the radial direction between the recording spot S_rec and the adjacent track servo spot S_ats is an inter-spot distance $D_{r-a}$, as shown in the drawings, the guiding prerecorded mark rows Mp are formed with a pitch Pt (formation pitch in the radial direction) that is twice the inter-spot distance $D_{r-a}$ or greater.

If the guiding prerecorded mark rows Mp are formed with a pitch that is twice the inter-spot distance $D_{r-a}$ or greater, as illustrated in the drawings, by performing the ATS such that the adjacent track servo spot S_ats is traced by the guiding prerecorded mark rows Mp, recording by the recording spot S_rec is performed between the guiding prerecorded mark rows. That is, trial writing of OPC is performed between the guiding prerecorded mark rows Mp.

By being able to perform trial writing between the guiding prerecorded mark rows Mp, by performing the same adjacent tracking servo as during the trial writing (that is, tracking servo in which the adjacent track servo spot S_ats traces the guiding recording mark row Mp), reading (evaluation) of the trial written signal is able to be performed using the recording spot S_rec (reproduction power). That is, in so doing, it is possible to avoid a situation in which tracking servo is performed with the trial written mark rows as the targets as in the related art.

As a result, it is possible to effectively prevent the occurrence of a situation in which it is not possible to suitably perform trial writing after the second rotation after starting the trial writing or a situation in which it is not possible to suitably perform an evaluation of the trial written signal as in the related art, and OPC is able to be suitably performed.

Here, to be sure, the pitch Pt is twice the inter-spot distance $D_{r-a}$ or greater so that the interval between the mark rows that are formed by the trial writing and the guiding prerecorded mark rows Mp does not exceed the optical limitation when trial writing is performed between the guiding prerecorded mark rows Mp as described above.

At this time, there is a tendency that the greater the value of the pitch Pt, the lower the recording density. That is to say, it is desirable that the pitch Pt be as small as possible while being within a range that satisfies the condition of being twice the inter-spot distance $D_{r-a}$ or greater. In other words, it is most desirable that the pitch Pt be set to twice the inter-spot distance $D_{r-a}$ in order to suppress a decrease in the recording density.

[1-3. Formation Technique of Prerecorded Mark Rows]

Figure 3:
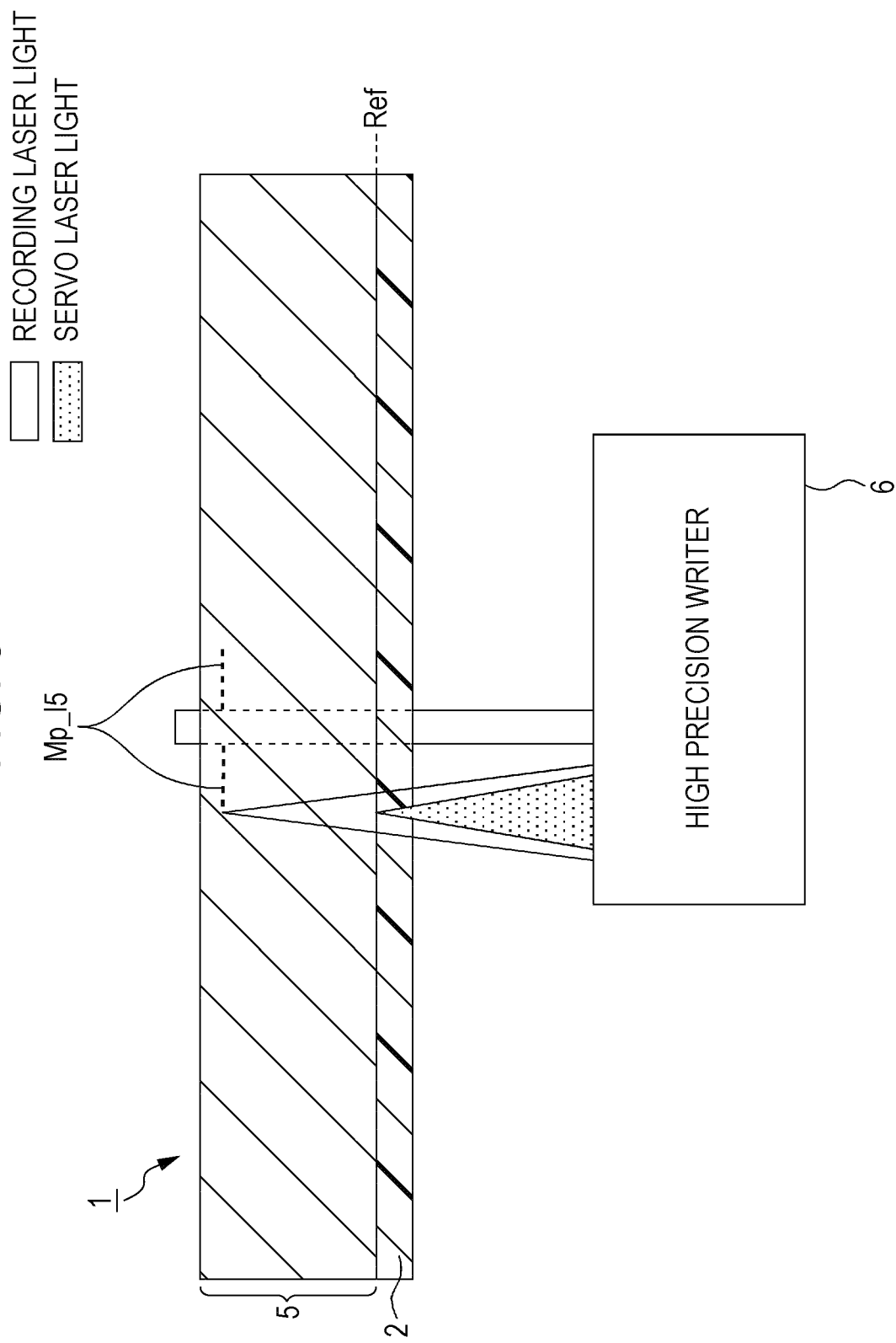
FIG. 3 is a diagram for describing a formation technique of a prerecorded mark row.

FIG. 3 is a diagram for describing a specific formation technique of the guiding prerecorded mark rows Mp.

As is seen from referring to FIG. 3, the guiding prerecorded mark rows Mp are formed within the bulk layer 5 using a writer (high precision writer 6) for forming the guiding prerecorded mark rows.

Here, the high precision writer 6 is configured to perform, on the bulk type recording medium 1, position control of the objective lens (that is, spot position control of the recording laser light) based on the position guides of the reference surface Ref that uses the servo laser light described earlier with reference to FIG. 11.

Specifically, while the high precision writer 6 is configured to irradiate the recording laser light and the servo laser light via the common objective lens and to control the position of the objective lens (tracking direction and focus direction) based on reflected light of the servo laser light from the reference surface Ref, by being equipped with a mechanism that changes the collimation state of the recording laser light that is incident on the objective lens as a recording light focusing mechanism described above, the high precision writer 6 is configured to be able to match the spot position of the recording laser light (focus direction) with a desired position within the bulk layer 5.

Furthermore, with such a configuration of irradiating the servo laser light and the recording laser light via the common objective lens, since spot position deviation (mainly in the tracking direction) is generated in the servo laser light and the recording laser light accompanying skewing or a lens shift and it becomes not possible to perform recording at the intended position, the high precision writer 6 is also equipped with a position deviation correction unit that corrects spot position deviation that accompanies such skewing or lens shift with high precision. As one example of such spot position deviation correction unit, one that detects the disc tilt amount and the lens shift amount and corrects the tilt of the optical axis of the recording laser light based on the detection result is exemplified.

Using such a high precision writer 6, mark rows are formed as the guiding prerecorded mark rows Mp on predetermined regions of each of the information recording layer positions L within the bulk layer 5.

As also described above, in the case of the present example, the guiding prerecorded mark row Mp are respectively formed on predetermined regions as OPC areas that are set in the innermost circumference portions within each of the information recording positions L.

Further, in the case of the present example, the high precision writer 6 forms the guiding prerecorded mark rows Mp by emission driving recording laser based on data rows that include such prerecorded mark row identification information and address information so that the prerecorded mark row identification information and address information are embedded in the guiding prerecorded mark rows Mp. Furthermore, as is also understood from the earlier description, such prerecorded mark row identification information and address information are inserted in the data rows with predetermined intervals.

Here, although a state in which the guiding prerecorded mark rows Mp are formed in order from the fifth information recording layer position L5 that is positioned to the lowermost layer side within the bulk layer 5 is illustrated in the drawings, the formation order of the guiding prerecorded mark rows Mp with respect to each of the information recording layer positions L is not limited thereto, and any order may be adopted.

<2. Specific Technique of OPC>

Figure 4:
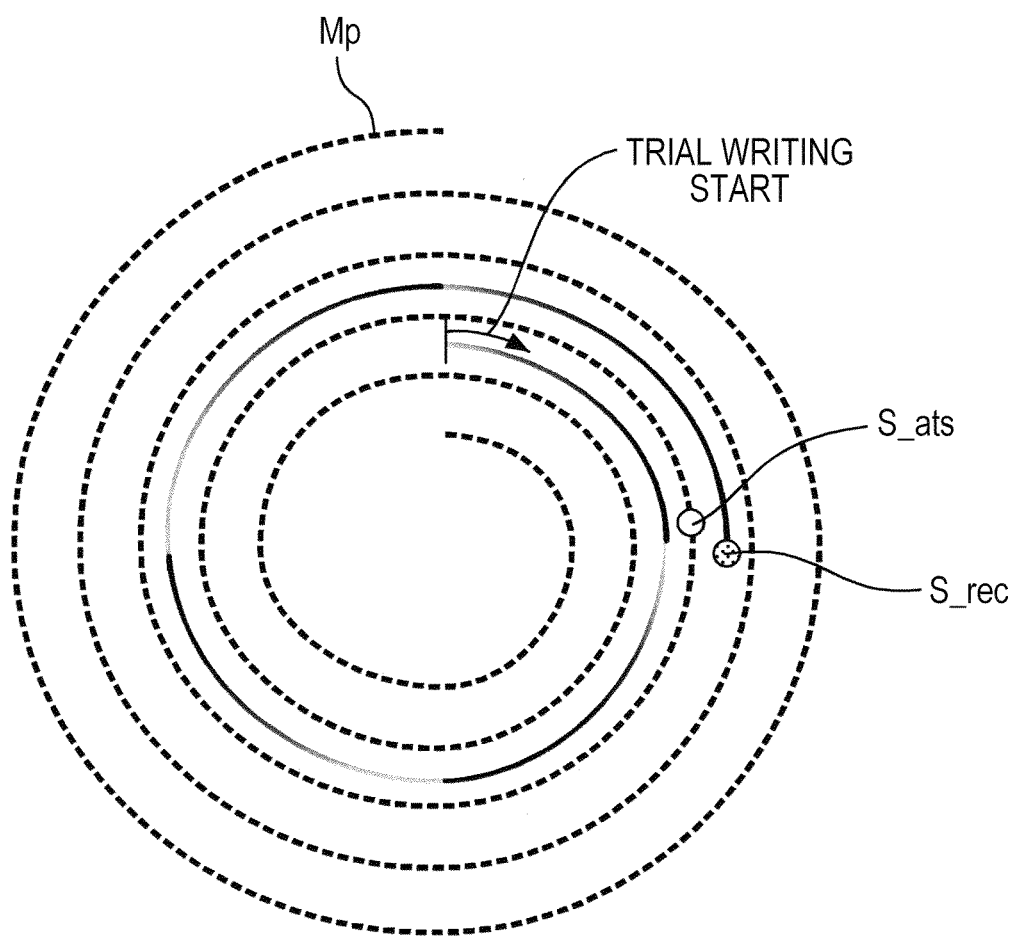
FIG. 4 is a diagram for describing a specific technique of a trial writing action using a prerecorded mark row of the embodiment.

A specific technique of the OPC in such a case will be described with reference to FIG. 4.

First, as is understood from the earlier description, in such a case, tracking servo by the ATS is performed such that the adjacent track servo spot S_ats traces the guiding prerecorded mark rows Mp when performing trial writing of the OPC.

Further, the address information that is recorded on the guiding prerecorded mark rows Mp is referenced in such a state, and trial writing by the recording spot S_rec (trial writing in which the power of the recording laser is successively changed) is began when a trial writing start position that is set in advance is reached.

In so doing, the trial writing is performed between the guiding prerecorded mark rows Mp as in the drawing.

When the trial writing is complete, evaluation of the signal that is recorded by the trial writing is performed. Specifically, signal quality evaluation is performed by calculating a predetermined evaluation value for evaluating the signal quality such as, for example, the jitter value, by reading the trial written signal using the recording spot S_rec (as reproduction power) in a state in which tracking servo by the ATS is performed such that the adjacent track servo spot S_ats traces the guiding prerecorded mark rows Mp similarly to when trial writing.

Power adjustment of the recording laser is performed by determining the optimal recording power based on the result of such a signal quality evaluation. The OPC is thereby completed.

Here, although a process to verify that the servo targets by the ATS are the guiding prerecorded mark rows Mp is performed based on the prerecorded mark row identification information that is recorded on the guiding prerecorded mark rows Mp in the embodiment, the process will be described later.

<3. Recording Device of Embodiment>

Figure 5:
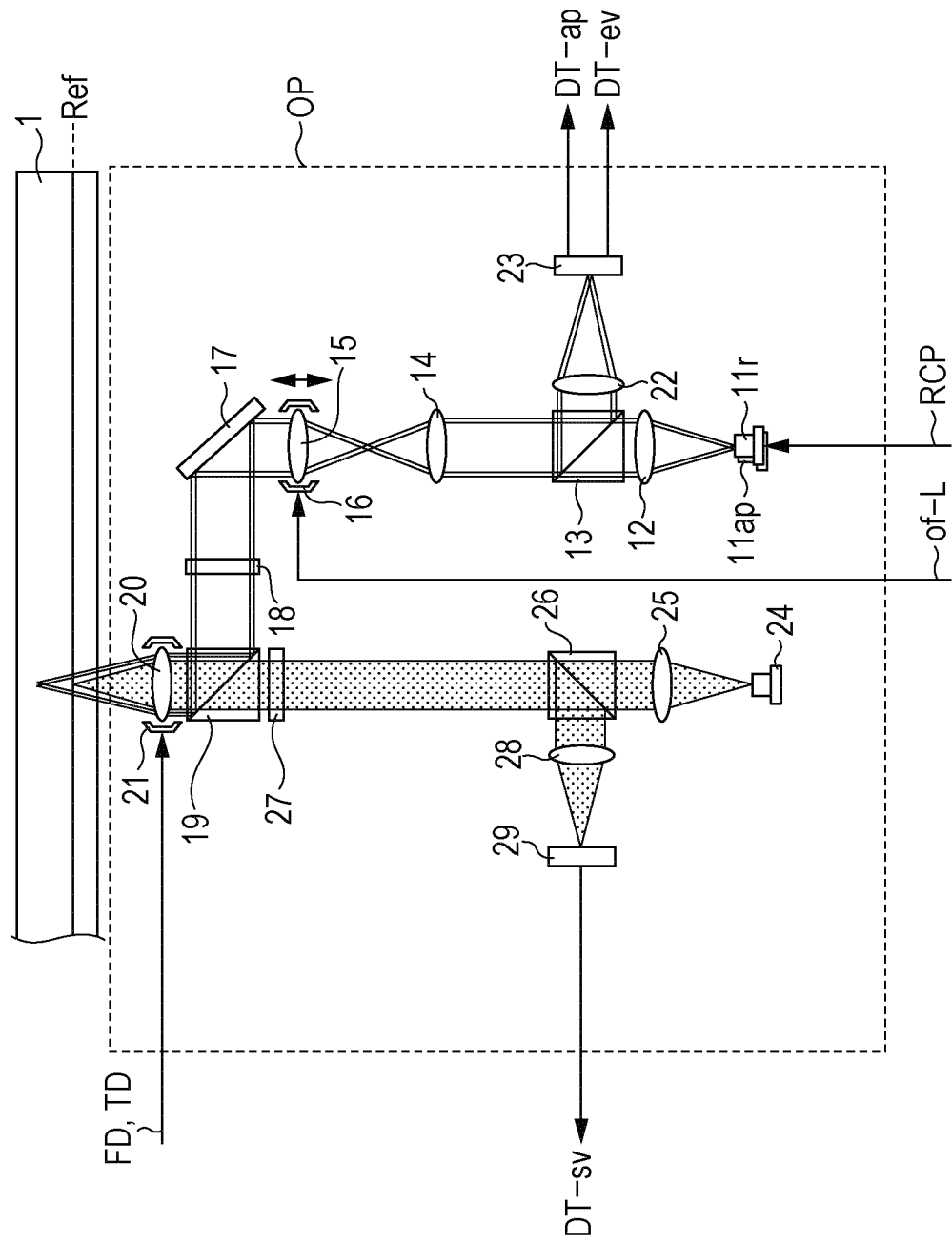
FIG. 5 is a diagram that mainly illustrates the configuration of an optical system that includes a recording device of the embodiment.

FIG. 5 is a diagram for describing mainly the configuration of an optical system that includes a recording device (referred to as a recording reproduction device 10) as an embodiment of performing OPC using the guiding prerecorded mark rows Mp that are formed on the bulk type recording medium 1. Specifically, the internal configuration of an optical pickup OP that the recording reproduction device 10 of the embodiment includes is mainly illustrated.

In FIG. 5, the bulk type recording medium 1 that is loaded in the recording reproduction device 10 is set by the center hole Ch thereof being clamped in a predetermined position of the recording reproduction device 10, and is retained in a state in which rotational driving by a spindle motor, which is omitted from the drawings, is possible.

The optical pickup OP is provided in order to irradiate recording laser light, servo laser light, and ATS laser light for forming the adjacent track servo spot S_ats on the bulk type recording medium 1 that is rotationally driven by the spindle motor.

Here, as will be clear from descriptions later, in the case of the present example, the ATS light is used as reproduction light for performing reproduction of recording signals during reproduction (during user data reproduction).

Recording laser 11r that is the light source of the laser light for performing information recording by marks and reading for the evaluation value calculation during the OPC and servo laser 24 that is the light source of the servo laser light that is light for performing position control using the position guides that are formed on the reference surface Ref are provided within the optical pickup OP. Further, laser 11ap for during ATS and reproduction that is the light source of laser light for performing reading of the recording signal during ATS and reproduction when recording is provided.

Here, as is understood from the earlier description of FIG. 11, the recording laser light and the servo laser light use light with different wavelength bands. In the case of the present example, the wavelength of the recording laser light is approximately 405 nm (so-called blue-violet laser light) and the wavelength of the servo laser light is approximately 650 nm (red laser light).

Further, since laser light with the laser 11ap for during ATS and reproduction which is to function as reproduction light for the ATS light or signal reading as the light source (hereinafter simply referred to as ATS light) is to permeate the selective reflection film 3 to reach within the bulk layer 5 while the recording reproduction wavelength is the same, the wavelength thereof is the same wavelength as the recording laser light.

An objective lens 20 that is a common output end of the recording laser light, the servo laser light, and the ATS light to the bulk type recording medium 1 is provided within the optical pickup OP.

A first light receiving unit 23 for receiving reflected light of the recording light from the bulk type recording medium 1 and reflected light of the ATS light from the bulk type recording medium 1 and a second light receiving unit 29 for receiving reflected light of the servo laser light from the bulk type recording medium 1 are further provided.

Moreover, an optical system for leading the recording laser light that is incident from the recording laser 11*r* and the ATS light that is incident from the laser 11*ap* for during ATS and reproduction to the objective lens 20 while leading reflected light of the recording laser light and the ATS light from the bulk type recording medium 1 which is incident to the objective lens 20 to the first light receiving unit 23 is formed.

Specifically, recording light that is incident from the recording laser 11*r* and ATS light that is incident from the laser 11*ap* for during ATS and reproduction is incident on a polarization beam splitter 13 after both are caused to be parallel light via a collimation lens 12. The polarization beam splitter 13 is configured so that the recording laser light and ATS light that are incident from the light source side in such a manner permeate.

The recording laser light and ATS light that permeate the polarization beam splitter 13 are incident on an expander that is composed of a fixed lens 14, a movable lens 15, and a lens driving unit 16. In the expander, by the fixed lens 14 being arranged on the side that is close to the light source, the movable lens 15 being arranged on the side that is far from the light source, and the movable lens 15 being driven in a direction that is parallel to the optical axis of the incident light by the lens driving unit 16, independent focus control of the recording laser light and ATS light is performed. The expander corresponds to the recording light focusing mechanism described above.

As will also be described later, the lens driving unit 16 of the recording light focus mechanism is driven according to the value of the offset of-L that is set corresponding to the information recording layer position L that is the recording target by the controller 39 illustrated in FIG. 6.

Each laser light via the fixed lens 14 and the movable lens 15 that configures the recording light focusing mechanism is incident on a dichroic prism 19 via a quarter wavelength plate 18 after being reflected by a mirror 17 as in the drawings.

The dichroic prism 19 is configured such that a selective reflection surface thereof reflects light with the same wavelength as the recording laser light and ATS light, and to permeate light with other wavelengths. Therefore, each laser light that is incident as described above is reflected by the dichroic prism 19.

Each laser light that is reflected by the dichroic prism 19 is irradiated on the bulk type recording medium 1 via the objective lens 20 as illustrated in the drawings.

Here, the recording spot S_rec and the adjacent track servo spot S_ats illustrated earlier in FIG. 2 and FIG. 4 are formed on the desired information recording layer positions L within the bulk 5 by the recording laser light and ATS light being irradiated via the objective lens 20 in such a manner.

The optical system in such a case is designed such that the positional relationship between the recording spot S_rec and the adjacent track servo spot S_ats is the relationship between the leading and the following described above, and the separation distance between the recording spot S_rec and the adjacent track servo spot S_ats is a predetermined distance as the inter-spot distance $D_{r-a}$ described above.

A double axis actuator 21 that retains the objective lens 20 to be displaceable in the focus direction (direction of moving to and from the bulk type recording medium 1) and the tracking direction (direction that is orthogonal to the focus direction: radial direction of the bulk type recording medium 1) is provided to the objective lens 20.

The double axis actuator 21 in such a case includes a focus coil and a tracking coil, and by conferring a driving signal (driving signals FD and TD described below) to each, the objective lens 20 is respectively displaced in the focus direction and the tracking direction.

Here, when executing ATS during recording or during reproduction, reflective light from prerecorded mark rows of the ATS light are obtained according to the ATS light being irradiated on the bulk type recording medium 1 as described above. Further, reflected light from mark rows that are formed from trial writing are obtained according to the recording laser light by the reproduction power being irradiated according to when the trial written signal that is recorded to accompany OPC is read (evaluated).

The reflected light of the recording laser light and ATS which is obtained in such a manner is led to the dichroic prism 19 via the objective lens 20 and reflected by the dichroic prism 19.

The reflected light of recording laser light and ATS light which is reflected by the dichroic prism 19 is incident on the polarization beam splitter 13 via the quarter wavelength plate 18, the mirror 17, and the recording light focusing mechanism (movable lens 15 to the fixed lens 14).

Here, the reflected light (returning light) of each laser light that is incident on the polarization beam splitter 13 in such a manner has a polarization direction that is different by 90 degrees compared to light (outgoing light) that is incident on the polarization beam splitter 13 from each light source side due to the action of the quarter wavelength plate 18 and the action of the reflection at the bulk type recording medium 1. As a result, the reflected light of each laser light that is incident as described above is reflected by the polarization beam splitter 13.

The reflected light of both the recording laser light and ATS light which is reflected by the polarization beam splitter 13 is concentrated on a light receiving surface of the first light receiving unit 23 via a light concentration lens 22.

Here, although a description with drawings is omitted, a recording light receiving photodetector that receives reflected light of the recording laser light and an ATS light receiving photodetector that receives reflected light of the ATS light are provided on the first light receiving unit 23.

In the case of the present example, only one light receiving element is included as the recording light receiving photodetector (since the reflected light of the recording light in such a case in only used for signal quality evaluation), and a plurality of light receiving elements (4 in such a case) are included in the ATS light receiving photodetector.

The light receiving signal that is obtained by the recording light receiving photodetector in the first light receiving unit 23 is referred to as a light receiving signal DT-ev.

Further, the light receiving signals that are obtained by the plurality of light receiving elements as the ATS light receiving photodetector are collectively referred to as a light receiving signal DT-ap.

Furthermore, in addition to the configuration of an optical system of the recording laser light and ATS light described above, an optical system for leading the servo laser light that is incident from the servo laser 24 to the objective lens 20 while leading the reflected light of the servo laser light from the bulk type recording medium 1 which is incident from the objective lens 20 to the second light receiving unit 29 is formed in the optical pickup OP.

As illustrated in the drawings, the servo laser light that is incident from the servo laser 24 is incident on a polarization beam splitter 26 after being caused to be parallel light via a collimation lens 25. The polarization beam splitter 26 is configured to permeate servo laser light (outgoing light) that is incident from the servo laser 24 side in such a manner.

The servo laser light that permeates the polarization beam splitter 26 is incident on the dichroic prism 19 via a quarter wavelength plate 27.

As described earlier, since the dichroic prism 19 is configured to reflect light with the same wavelength band as the recording laser light and ATS light and to permeate light with other wavelengths, the servo laser light permeates the dichroic prism 19 and is irradiated on the bulk type recording medium 1 via the objective lens 20.

Further, the reflected light (reflected light from the reference surface Ref) of the servo laser light that is obtained according to the irradiation of the servo laser light on the bulk type recording medium 1 in such a manner permeates the dichroic prism 19 after permeating via the objective lens 20 and is incident on the polarization beam splitter 26 via the quarter wavelength plate 27.

Similarly to the case of the earlier recording laser light and ATS light, the reflected light (returning light) of the servo laser light that is incident from the bulk type recording medium 1 side in such a way has a polarization direction that is different by 90 degrees from that of the outgoing light due to the action of the quarter wavelength plate 27 and the action of the reflection at the bulk type recording medium 1, and the reflected light of the servo laser light as the returning light is therefore reflected by the polarization beam splitter 26.

The reflected light of the servo laser light which is reflected by the polarization beam sp 26 is concentrated on a light receiving surface of the second light receiving unit 29 via a light concentration lens 28.

Here, although a description by drawings is omitted, a slide driving unit that sliding drives the entirety of the optical pickup OP described above in a tracking direction is in reality provided on the recording reproduction device 10, and the irradiation position of laser light is able to be displaced over a wide range by the driving of the optical pickup OP by the sliding driving unit.

Figure 6:
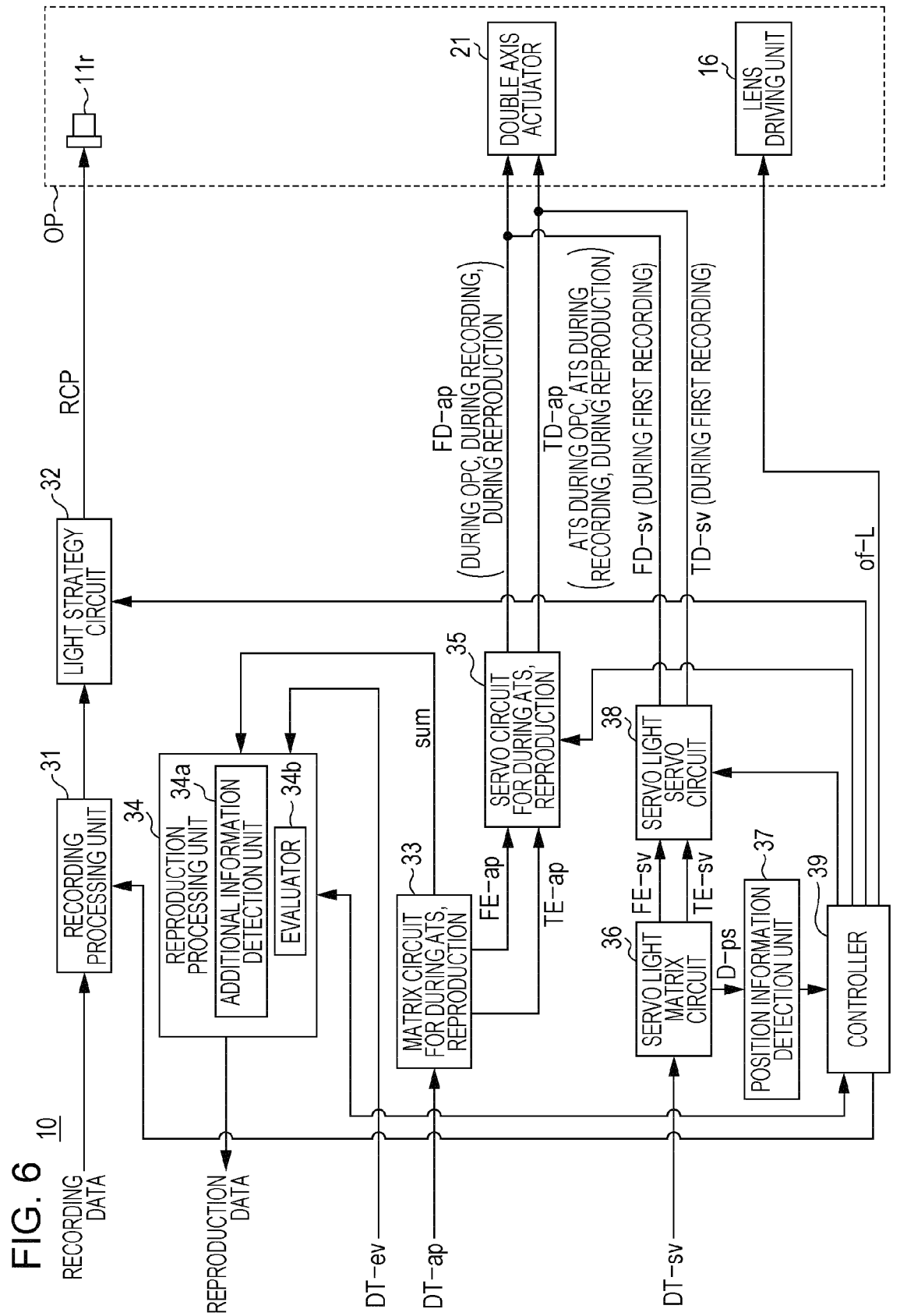
FIG. 6 is a diagram that illustrates the overall internal configuration of a recording device of the embodiment.

FIG. 6 illustrates the overall internal configuration of the recording reproduction device 10.

Here, in FIG. 6, the overall internal configuration of the optical pickup OP is illustrated with only the recording laser 11r, the lens driving unit 16, and the double axis actuator 21 extracted out of the configuration illustrated earlier in FIG. 2.

In FIG. 6, a recording processing unit 31, a light strategy circuit 32, a matrix circuit for during ATS and reproduction 33, and a reproduction processing unit 34 in the drawing are provided as a signal processing system relating to recording laser light and ATS light on the recording reproduction device 10.

Data to be recorded on the bulk type recording medium 1 (recording data) is input to the recording processing unit 31. The recording processing unit 31 obtains a recording modulation data row that is a binary data row of, for example, "0" and "1" which is actually recorded on the bulk type recording medium 1 by performing addition of an error correction code, predetermined recording modulation encoding, or addition of address information to the input recording data.

The light strategy circuit 32 generates a recording pulse signal RCP based on the recording modulation data row that is generated by the recording processing unit 31 according to set parameters, and performs light emission driving of the recording laser 11r within the optical pickup OP by the recording pulse signal RCP.

Further, the light strategy circuit 32 causes the recording laser 11r to be emitted with reproduction power according to an instruction from the controller 39 when reading a trial written signal during OPC.

The light receiving signal DT-ap from a plurality of light receiving elements as ATS light receiving photodetectors within the first light receiving unit 23 described above is input to the matrix circuit for during ATS and reproduction 33.

The matrix circuit for during ATS and reproduction 33 generates the various types of signals that are used for matrix operation processing based on the light receiving signal DT-ap.

Here, in the case of the present example, during reproduction of signals that are recorded by mark rows on the bulk layer 5 (during reproduction of user data), ATS light is used as the laser light for reproduction. Yet during reproduction, focus servo control and tracking servo control with the pre-recorded mark rows as targets are performed based on reflected light of the ATS light.

In response, the matrix circuit for during ATS and reproduction 33 is configured to generate a sum signal sum that corresponds to the reproduction of the recording modulation data rows described above, a focus error signal FE-ap for focus servo control (signal that represents focus error with respect to the mark rows), and a tracking error signal TE-ap for tracking servo control (signal that represents a position error of the adjacent track servo spot S_ats in the radial direction with respect to the prerecorded mark rows) based on the light receiving signal DT-ap.

The sum signal sum that is generated by the matrix circuit for during ATS and reproduction 33 is supplied to the reproduction processing unit 34.

Further, the focus error signal FE-ap and the tracking error signal TE-ap are supplied to a servo circuit for during ATS and reproduction 35.

The reproduction processing unit 34 performs reproduction processing for restoring the recording data described above such as binarization processing or decoding and error correction of the recording modulation code with regard to the sum signal sum, and obtains reproduction data of the reproduced recording data.

Here, an additional information detection unit 34a is provided on the reproduction processing unit 34.

The additional information detection unit 34a performs detection of additional information that is embedded at predetermined intervals on mark rows such as, for example, address information. Particularly in the case of the present example, the prerecorded mark row identification information described above is embedded in the guiding prerecorded mark rows Mp as additional information, and the additional information detection unit 34a detects additional information such as the prerecorded mark row identification information or the address information based on the sum signal sum.

The detection signal of the additional information detection unit 34a is supplied to the controller 39. Further, an evaluator 34b is provided on the reproduction processing unit 34.

As illustrated in the drawings, the light receiving signal DT-ev from a recording light receiving photodetector of the first light receiving unit 23 is input to the reproduction processing unit 34, and the evaluator 34b calculates an evaluation value that is an evaluation index of signal quality with regard to signals that are recorded by trial writing during OPC based on the light receiving signal DT-ev. Specifically, in such a case, a jitter value, for example, is calculated as the evaluation value.

The evaluation value that is calculated by the evaluator 34b is supplied to the controller 39.

The servo circuit for during ATS and reproduction 35 generates a focus servo signal FS-ap and a tracking servo signal TS-ap based respectively on the focus error signal FE-ap and the tracking error signal TE-ap. Further, by driving the focus coil and the tracking coil of the double axis actuator 21 based on a focus driving signal FE-ap and a tracking driving signal TD-ap that are generated based on the focus servo signal FS-ap and the tracking servo signal TS-ap according to an instruction from the controller 39, focus servo control and tracking servo control of the objective lens 20 is realized.

Furthermore, the servo circuit for during ATS and reproduction 35 realizes a track jump action or performs drawing control of the tracking servo or the like by conferring a jump pulse to the tracking coil of the double axis actuator 21 by setting the tracking servo loop to be OFF according to an instruction from the controller 39. Further, drawing control of the focus servo with respect to mark rows that are formed on the desired information recording layer positions L, or the like is performed.

Here, as is also illustrated in the drawings, the focus driving signal FD-ap is used during OPC (during trial writing and evaluation), during recording, and during reproduction.

Further, the tracking error signal TE-ap is used for the ATS during OPC and during recording, and for the tracking servo with respect to the recording mark rows during reproduction.

In addition, with regard to the recording reproduction device 10, a servo light matrix circuit 36, a position information detection unit 37, and a servo light servo circuit 38 are provided as a signal processing system of reflected light of the servo laser light.

The servo matrix circuit 36 generates the signals to be used based on the light receiving signal DT-sv from the plurality of light receiving elements in the second light receiving unit 29 illustrated in FIG. 2.

Specifically, the servo light matrix circuit 36 in such a case generates the tracking error signal TE-sv that represents a position error in the radial direction of the irradiation spot of the servo laser light with respect to the guide channels (tracks) that are formed on the reference surface Ref as a signal for performing tracking servo control. Further, the focus error signal FE-sv that represents a focus error of the servo laser light with respect to the reference surface Ref (selective reflection film 3) is generated as a signal for performing focus servo control.

Furthermore, a position information detection signal Dps for detecting position information that is recorded on the reference surface Ref is generated. As the position information detection signal Dps, in a case when the position information is recorded by pit rows, for example, the sum signal is generated. Alternatively, in a case when the position information is recorded by wobbling grooves, a push pull signal is generated.

The position information detection signal Dps is supplied to the position information detection unit 37. The position information detection unit 37 detects the position information that is recorded on the reference surface Ref based on the position information detection signal Dps. The detected position information is supplied to the controller 39.

Further, the focus error signal FE-sv and the tracking error signal TE-sv that are generated by the servo light matrix circuit 36 are supplied to the servo light servo circuit 38.

The servo light servo circuit 38 generates the focus servo signal FS-sv and the tracking servo signal TS-sv based respectively on the focus error signal FE-sv and the tracking error signal TE-sv.

Furthermore, by driving the focus coil and tracking coil of the double axis actuator 21 based on the focus driving signal FD-sv and the tracking driving signal TD-sv that are generated based on the focus servo signal FS-sv and the tracking servo signal TS-sv according to an instruction from the controller 39, focus servo control and tracking servo control of the objective lens 20 are realized.

Furthermore, the servo light servo circuit 38 realizes a track jump action or performs drawing control of the tracking servo or the like by conferring a jump pulse to the tracking coil of the double axis actuator 21 by setting the tracking servo loop to be off according to an instruction from the controller 39. Further, drawing control of the focus servo with respect to the reference surface Ref is performed.

The controller 39 is configured by a microcomputer including, for example, a CPU (Central Processing Unit) and a memory (storage device) such as a ROM (Read Only Memory) or a RAM (Random Access Memory), and performs overall control of the recording reproduction device 10 by performing, for example, control and processing obeying a program that is stored in the above ROM or the like.

For example, the controller 39 performs control (setting) of the focus position of the recording laser light and ATS light based on the values of the offsets of-L that are set in advance to correspond with each of the layer positions L. Specifically, by driving the lens driving unit 16 within the optical pickup OP based on the value of the offset of-L that is set to correspond with the information recording layer position L that is the recording target, selection of the recording position in the depth direction and the focus position of the ATS light are performed.

In addition, the controller 39 of the present example performs control for performing tracking servo and focus servo by techniques that respectively correspond to when recording for the first time in the user area and in other cases, that is, during OPC (during trial writing, during evaluation), during recording, and during reproduction.

Here, in the case of the present example, in a case when performing recording for the first time in the user data area, in order to make servo by the ATS possible, recording for the first time corresponding to at least one rotation is performed.

During such recording for the first time, similarly to the related art, position control using position control using reflected light of the servo laser light from the reference surface Ref and focus control by the recording light focusing mechanism together is performed. Specifically, when recording in the user data area for the first time, while performing control so that the double axis actuator 21 is driven by the focus driving signal FD-sv and the tracking driving signal TD-sv from the servo light servo circuit 38, the lens driving unit 16 is driven so that the focus position of the recording laser light matches the information recording layer position L that is the recording target.

Further, during OPC (during trial writing, during evaluation), during recording (after recording for the first time), and during reproduction, focus servo and tracking servo are performed based on the reflected light of the ATS light from the mark rows. For such a reason, during OPC, during recording, and during reproduction, the controller 39 performs control such that the double axis actuator 21 is driven by the focus driving signal FD-ap and the tracking driving signal TD-ap from the servo circuit for during ATS and reproduction 35.

In addition, the controller 39 performs OPC processing.

That is, as the OPC processing, trial writing of firstly controlling such that ATS by the ATS light with the guiding prerecorded mark rows Mp as the targets is able to be performed and successively changing the laser power of the recording laser 11r by performing an instruction to the light strategy circuit 32 is executed.

Further, after the trial writing, in a state in which the ATS is similarly performed by controlling such that ATS by the ATS light with the guiding prerecorded mark rows Mp as the targets is able to be performed, reading of the trial written signal is executed by irradiating the recording laser light with the reproduction power by an instruction to the light strategy circuit 32. Further, by obtaining an evaluation value that is calculated by the evaluator 34b according to the reading, the optimal recording power is determined based on the evaluation value. Information of the determined recording power is conferred to the light strategy circuit 32.

In addition, during the OPC, in performing the trial writing or obtaining of the evaluation value, determination of whether or not the mark rows that the ATS light traces are the guiding prerecorded mark rows Mp is performed.

Such a determination is performed based on the detection signal of the additional information detection unit 34a in which detection of the prerecorded mark identification information from the reproduction signal (sum) based on the light receiving signal DT-ap relating to the ATS light is possible. Specifically, when accessing the start position of trial writing and when accessing the start position of the reading of the trial written signal, the controller 39 inputs the detection signal by the additional information detection unit 34a and performs a determination process of whether or not the prerecorded mark row identification information is detected from the reproduction signal of the mark rows.

As a result of the determination process, in a case when a negative result that the prerecorded mark row identification information is not detected is obtained, since the mark rows that are the servo target are mark rows that are formed by the trial writing, the mark rows that are the servo target are made to be the guiding prerecorded mark row Mp by performing a track jump instruction to the servo circuit for during ATS and reproduction 35, or the like.

On the other hand, in a case when an affirmative result that the prerecorded mark row identification information is detected as a result of the determination process, control is performed such that the trial writing is executed, or when evaluating, setting (adjustment) to the light strategy circuit 32 of the optimal recording power based on the signal quality evaluation of the signal that is recorded by the trial writing or the evaluation result is performed.

According to the recording reproduction device 10 as described above, it is possible to perform trial writing between the guiding prerecorded mark rows Mp while appropriately reading the trial written signal and performing signal quality evaluation in accordance with the bulk type recording medium 1 of the embodiment. That is to say, OPC is appropriately performed on the bulk type recording medium 1 of the embodiment.

<4. Modified Examples>

Although the embodiment of the disclosure has been described above, embodiments of the disclosure are not limited to the specific examples described thus far.

For example, although a case in which the light source of the recording light and the light source of the ATS light are provided separately has been exemplified in the description thus far, a common light source is also possible. In such a case, the recording light and the ATS light may be respectively obtained by dividing laser light that is incident from a common light source into a plurality of beams by grating or the like.

Further, although a case in which reproduction of the recording signal and the focus and tracking servo control during reproduction is performed using reflected light of the light that is used as the ATS light during recording, that is, not using the recording laser light during reproduction has been exemplified in the description thus far, it is also possible to conversely perform reproduction of the recording signal and the focus and tracking servo control during reproduction by using reflected light of the recording laser light (reproduction power).

Further, although the guiding prerecorded mark rows Mp are only formed in the innermost circumference region in the description thus far, the guiding prerecorded mark rows Mp may be formed in the outermost circumference region, or may be provided in each zone by dividing the disc into a plurality of zones in the radial direction.

Furthermore, in relation to multilayer recording, although a case in which recording is performed by a parallel track pass has been described thus far, an opposite track pass may also be adopted.

In the case of the opposite track pass, the recording directions between adjacent information recording layer positions L are respectively different. Therefore, in order to appropriately realize ATS at each of the layer positions L, the ATS light is positioned on the inner circumference side with respect to the recording laser light in one layer position L while being positioned on the outer circumference side for an adjacent layer position L (since the ATS light is a following beam).

In such a case, therefore, the optical system is configured such that the laser light that is incident from the laser for during ATS and reproduction 11ap is divided into a plurality of beams, and while the irradiation spot position of one of the beams is a position that is separated from the recording spot S_rec by the inter-spot distance $D_{r-a}$ to the inner circumference side, while the irradiation spot position of another beam is separated from the recording spot S_rec by the inter-spot distance $D_{r-a}$. Furthermore, in such a case, the optical system may be configured by providing a photodetector that receives reflected light of a beam that is positioned on the inner circumference side and a photodetector that receives reflected light of a beam that is positioned on the outer circumference side as the first light receiving unit 23, and selecting and using the light receiving signal that corresponds to either photodetector for each layer position L that is the target of OPC, recording, and reproduction.

Figure 7:
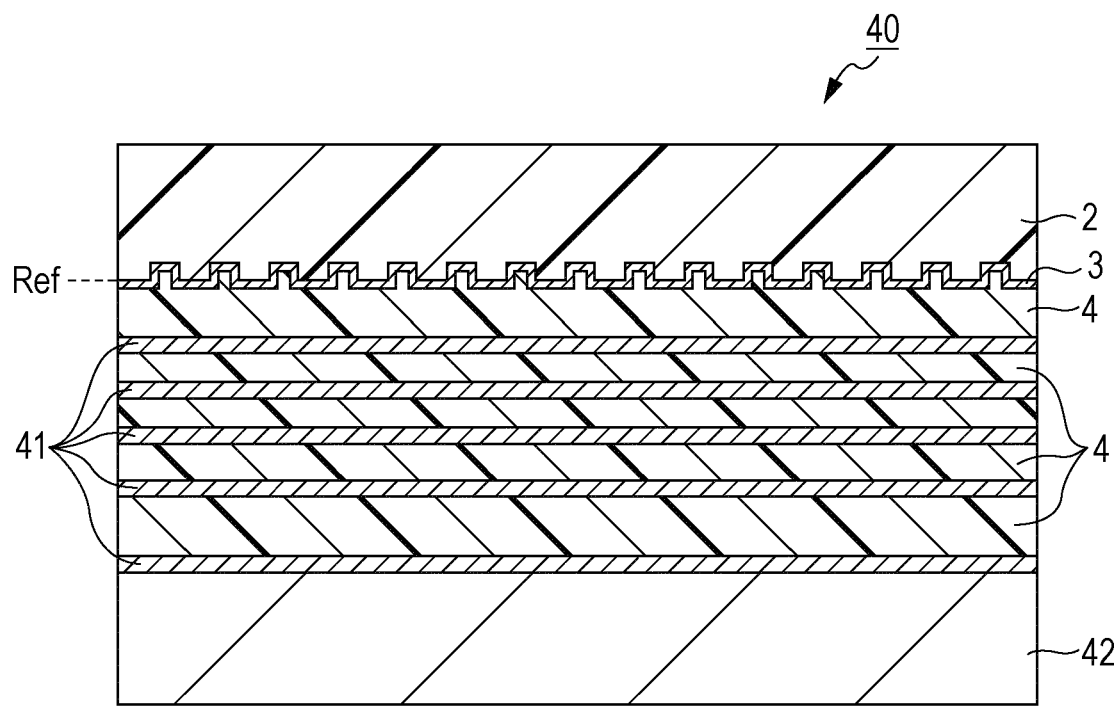
FIG. 7 is a cross-sectional structure diagram of an optical recording medium as a modified example.

Furthermore, although a case in which an embodiment of the disclosure is applied in a case when performing multilayer recording with the bulk type recording medium 1 including a bulk-form recording medium on which a recording film is not formed as the target has been described in the description this far, an embodiment of the disclosure is also able to be suitably applied in a case when recording to the multilayer recording medium 40 illustrated I FIG. 7 is performed.

Although the point that the multilayer recording medium 40 is formed with the cover layer 2, the selective reflection film 3, and the intermediate layer 4 in order from the upper layer side is the same in FIG. 7 as the bulk type recording medium 1 in FIG. 1, in such a case, a recording layer that includes a layer structure in which a semitransparent recording film 41 and the intermediate layer 4 are repeatedly laminated a certain number of times as in the drawing is formed instead of the bulk layer 5. The semitransparent film 41 that is formed on the lowermost layer as in the drawing is laminated over a substrate 42. Here, a total reflection recording film is used as the recording film that is formed on the lowermost layer.

Here, it is to be noted that position guides of pit rows or grooves are not formed on the transparent recording film 41. That is, also in such a multilayer recording medium 40, a position guide is only formed on one layer position as the reference surface Ref.

Here, with the recording layer of such a multilayer recording medium 40, since the semitransparent recording film 41 that functions as a reflection film is formed, even when recording for the first time as above, it is possible to perform, with regard to the focus servo, focus servo that is based on the reflected light of the ATS light (or the recording laser light).

Furthermore, although a case in which the reference surface Ref is formed more on the upper layer side that the recording layer has been exemplified in the description thus far, an embodiment of the disclosure is able to be suitably applied to a case in which the reference surface Ref id formed more on the lower surface side than the recording layer.

Figure 8:
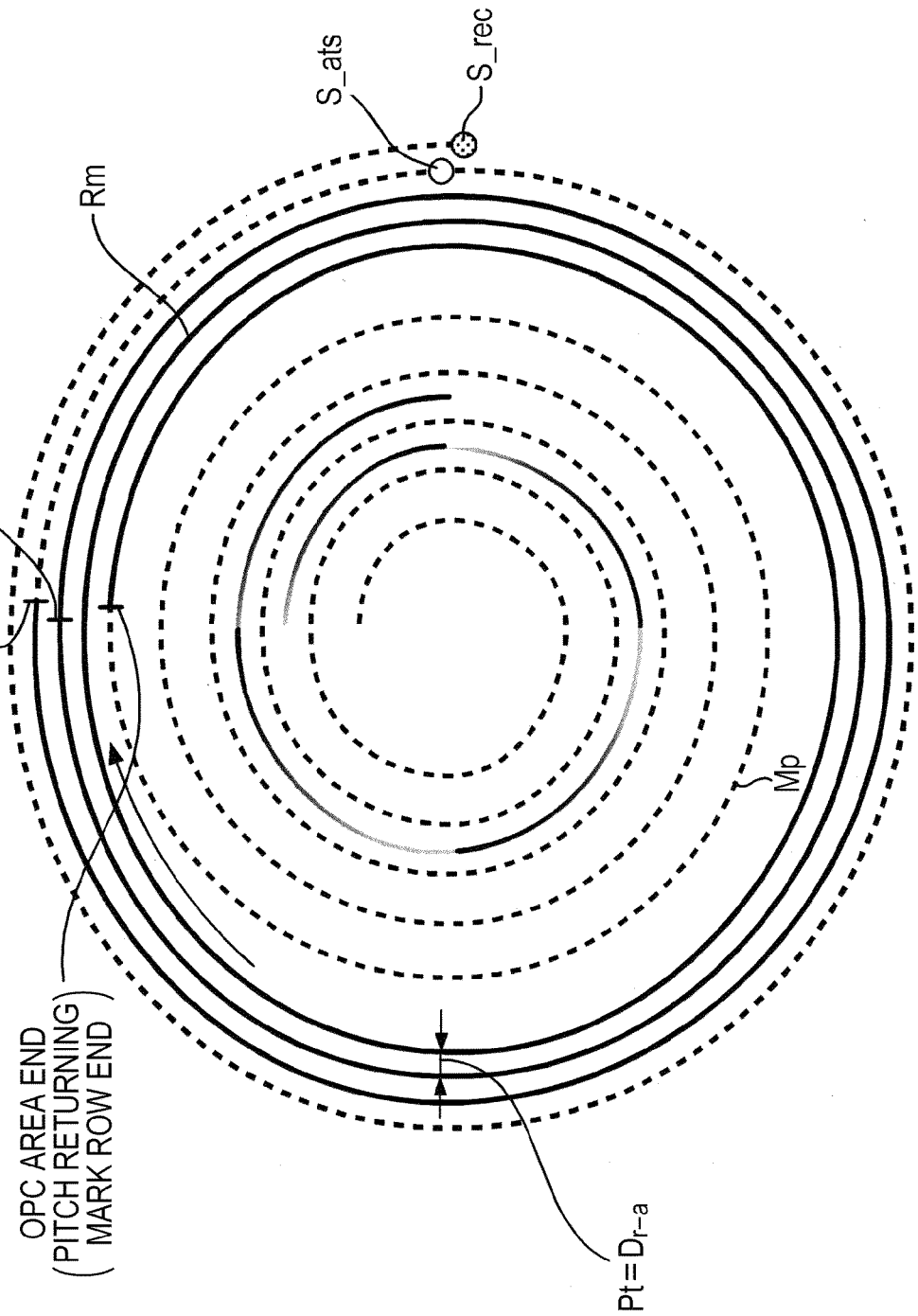
FIG. 8 is a diagram for describing a technique for recording user data from an OPC area by continuing ATS.
Figure 9:
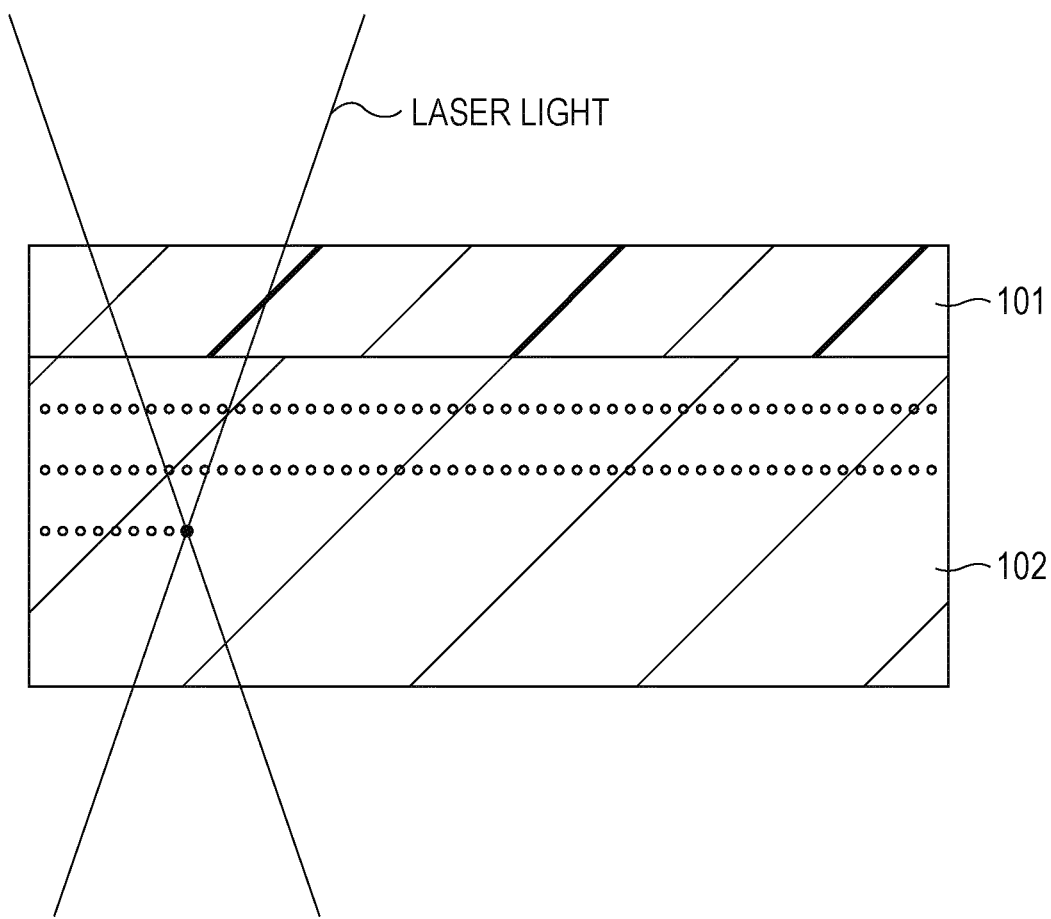
FIG. 9 is a diagram for describing a bulk recording technique.
Figure 10:
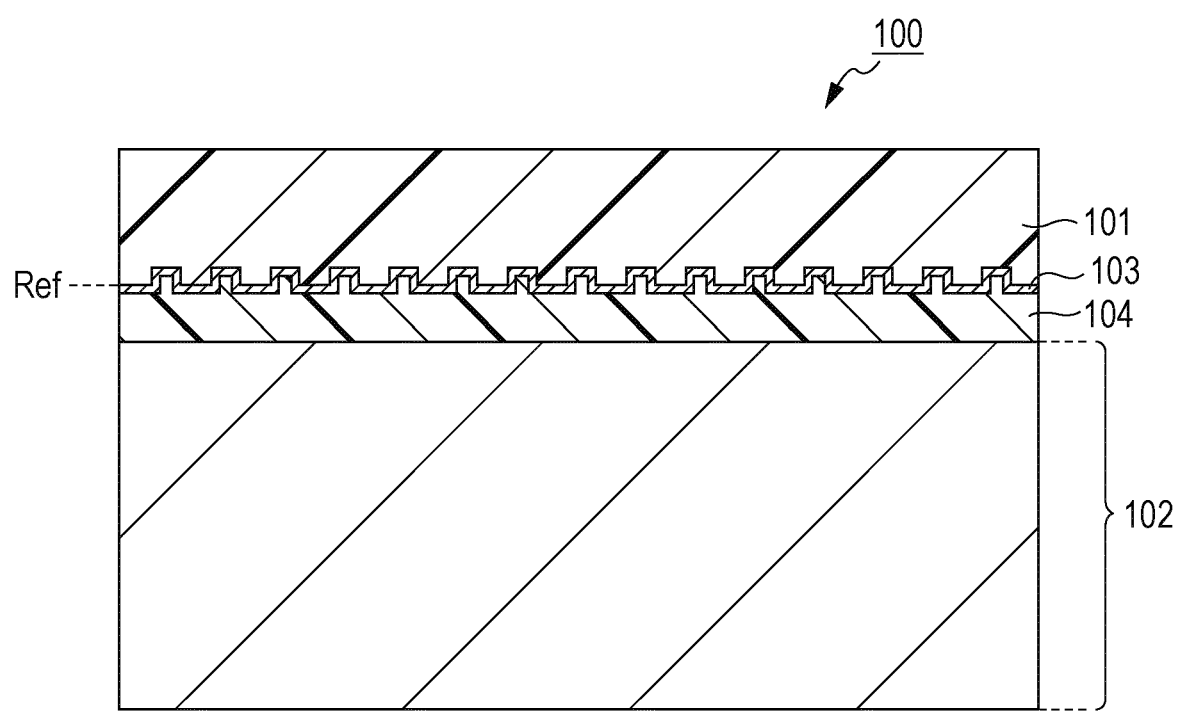
FIG. 10 is a diagram that exemplifies a cross-sectional structure of an actual bulk type recording medium that includes a reference surface.

Furthermore, although a case in which recording for the first time corresponding to at least one rotation to make the ATS possible is performed in a case when performing recording to the user data area for the first time has been exemplified in the description thus far, by continuously forming pitch returning mark rows Rm as illustrated in FIG. 8 on the guiding prerecorded mark rows Mp, it is also possible to record the user data while maintaining the ATS from a state in which the ATS is performed on the guiding prerecorded mark rows Mp.

As illustrated in FIG. 8, the pitch returning mark row Rm is continuously formed from OPC area end (end of the guiding prerecorded mark row Mp), and is formed to return the pitch Pt to a normal pitch (=inter-spot distance $D_{r-a}$) by gradually narrowing the interval with the mark row that is adjacent to the inner circumference side after the end of the OPC area.

Specifically, in the example of the drawing, as illustrated by the solid arrow in the drawing, the pitch Pt is gradually returned to a normal pitch (=inter-spot distance $D_{r-a}$) from a position that is rotated by approximately ⅘ rotation from the OPC area end.

By the pitch Pt being returned to a normal pitch in such a manner, the recording spot S_rec is able to be positioned over an extension of the guiding prerecorded mark row Mp. That is to say, it becomes possible to perform user data recording by the recording spot S_rec over an extension of the guiding prerecorded mark row Mp (and also over an extension of the pitch returning mark row Rm) while maintaining the ATS from a state of performing the ATS on the guiding prerecorded mark row Mp.

Specifically, in the example of FIG. 8, the pitch returning mark row Rm is formed over three rotations from the end of the OPC area. As in the drawing, the end of the pitch returning mark row Rm is the recording start position of the user data (that is, the user data area start).

In order to start data recording from such an end of the user data area, in such a case, recording of the user data by the recording spot S_rec is started at a timing when the adjacent track servo spot S_ats reaches a position that is substantially one rotation before the start of the user data, which is illustrated as "A" in the drawing.

Here, in the case of the example illustrated in FIG. 8, if trial writing is performed when the ATS is performed on the final rotation of the guiding prerecorded mark row Mp, the interval of the mark row exceeds the optical limitation in a pitch returning segment as the segment of the solid arrow. Therefore, in such a case, the final segment that corresponds to the pitch returning segment in the final rotation of the guiding prerecorded mark row is set to be not used as a trial writing region.

In addition, although the pitch returning mark row Rm is formed over three rotations in the example of FIG. 8, in order to position the recording spot S_rec over an extension of the guiding prerecorded mark row Mp, the pitch returning mark row Rm may at least be formed on only the pitch returning segment.

With the technique using the pitch returning mark row Rm as described above, since recording for the first time corresponding to one rotation in order to make ATS possible is not performed within the user data area, servo control based on the servo laser light for the recording for the first time is not performed either.

Therefore, as a result, in the recording reproduction device 10, as well as being able to omit the reference surface Ref, it is possible to omit the configuration relating to the servo laser light (optical system relating to the servo laser light and signal processing system), the recording light focusing mechanism, and the dichroic prism 19, and it is possible to reduce the manufacturing cost of the recording medium and to reduce the manufacturing cost of the recording reproduction device 10.

Furthermore, although a case in which an embodiment of the disclosure is applied to a recording reproduction device that performs both recording and reproduction with regard to the optical recording medium has been exemplified, an embodiment of the disclosure is also suitably applied to a recording specific device (recording device) in which only recording with regard to the optical recording medium is possible.

The present disclosure contains subject matter related to that disclosed in Japanese Priority Patent Application JP 2010-242069 filed in the Japan Patent Office on Oct. 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium in which recording is performed by a recording device that is configured such that tracking servo control of recording light is performed by irradiating the recording light and ATS light for an adjacent track servo and by an adjacent track servo based at least in part on reflected light of the ATS light,
wherein while a recording layer in which a mark, formed according to an irradiation of the recording light, is included,
a mark row is formed in advance by a pitch that is at least twice a distance between an irradiation spot of the recording light and an irradiation spot of the ATS light in the recording layer.

2. The optical recording medium according to claim 1, wherein while being a disc-shaped optical recording medium,
the mark row is formed on at least one of an inner circumference side or an outer circumference side from a user data region in the recording layer.

3. The optical recording medium according to claim 2, wherein the mark row is formed by recording predetermined information that includes prerecorded mark row identification information for identifying a mark row that is formed in advance.

4. The optical recording medium according to claim 3, wherein the mark row is formed in a plurality of positions in a depth direction within the recording layer.

5. The optical recording medium according to claim 4, wherein the recording layer is a bulk-form recording layer in which a recording film is not formed.

6. The optical recording medium according to claim 4, wherein the recording layer is a multilayer recording layer in which a plurality of recording films are formed.

7. The optical recording medium according to claim 1, wherein following the mark row that is formed by a pitch that is at least twice a distance between an irradiation spot of the recording light and an irradiation spot of the ATS light, a pitch returning mark row for returning a pitch of a mark row to the same pitch as the distance between the irradiation spot of the recording light and the irradiation spot of the ATS light is formed.

8. A recording device configured such that tracking servo control of recording light is performed by irradiating the recording light and ATS light for an adjacent track servo and an adjacent track servo based at least in part on reflected light of the ATS light with respect to an optical recording medium, the recording device comprising:

a light irradiation and light receiving unit configured to irradiate the recording light and the ATS light on the optical recording medium in which a mark row is formed in advance by a pitch that is at least twice a distance between an irradiation spot of the recording light and an irradiation spot of the ATS light in a recording layer thereof via a common objective lens, and configured to receive the reflected light of the ATS light from the optical recording medium;

a tracking mechanism unit configured to retain the objective lens to be displaceable in a tracking direction;

a tracking error signal generation unit configured to generate a tracking error signal that represents an error of an irradiation spot position of the ATS light in a tracking direction with respect to a mark row that is formed in the recording layer, based at least in part on a light receiving signal of the ATS light which is obtained by the light irradiation and receiving unit;

an adjacent track servo control unit configured to control the tracking mechanism unit so as to follow a mark row in which an irradiation spot of the ATS light is formed on the recording layer based at least in part on the tracking error signal; and a control unit configured to perform control such that trial writing in which a power of successive recording light is changed in a state in which an irradiation spot of the ATS light follows the mark row that is formed in advance by a tracking servo control by the adjacent track servo control unit.

9. The recording device according to claim 8, wherein the mark row is formed by recording predetermined information that includes prerecorded mark row identification information for identifying a mark row that is formed in advance, the recording device further including:

a reproduction unit configured to obtain a reproduction signal of information that is recorded from the mark row based at least in part on the light receiving signal, wherein the control unit is configured to determine whether a mark row that is a target of a tracking servo by the adjacent track servo control unit is the mark row that is formed in advance, and perform control such that the trial writing is performed based at least in part on the result.

10. The recording device according to claim 9, wherein the control unit is configured to perform control to change a power of the recording light to a reproduction power during an evaluation of a signal that is recorded by the trial writing, wherein the light irradiation and light receiving unit is configured to receive reflected light for evaluation as reflected light from an irradiation spot of the recording light with the reproduction power, and the recording device further includes:

an evaluation unit configured to calculate an evaluation value for evaluating a quality of a signal that is recorded by the trial writing based at least in part on a light receiving signal of the reflected light for evaluation which is obtained from the light irradiation and light receiving unit.

11. The recording device according to claim 10, wherein the control unit determines, during an evaluation of a signal that is recorded by the trial writing, whether a mark row that is a target of a tracking servo by the adjacent track servo control unit is the mark row that is formed in advance based at least in part on a reproduction signal by the reproduction unit and performs control such that power adjustment of the recording light on the basis of the evaluation value based on the results.

* * * * *